(12) United States Patent
Komuro

(10) Patent No.: US 6,819,663 B2
(45) Date of Patent: *Nov. 16, 2004

(54) INTERNET TELEPHONE SYSTEM

(75) Inventor: Toshinao Komuro, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/039,246

(22) Filed: Mar. 16, 1998

(65) Prior Publication Data

US 2002/0057672 A1 May 16, 2002

(30) Foreign Application Priority Data

Oct. 16, 1997 (JP) .............................................. 9-284026

(51) Int. Cl.⁷ .............................................. H04L 12/66
(52) U.S. Cl. .................... 370/352; 370/356; 379/88.17; 379/93.01; 709/217; 709/238
(58) Field of Search .................................. 370/351, 352, 370/353, 354, 355, 356; 709/217, 218, 219, 223, 224, 225, 226, 238; 379/88.17, 93.01, 93.05

(56) References Cited

U.S. PATENT DOCUMENTS

| | | | | |
|---|---|---|---|---|
| 5,608,786 A | * | 3/1997 | Gordon | 370/352 |
| 5,610,910 A | * | 3/1997 | Focsaneanu et al. | 370/351 |
| 5,708,699 A | * | 1/1998 | Concepcion et al. | 379/88.19 |
| 5,732,078 A | * | 3/1998 | Arango | 370/355 |
| 5,828,666 A | * | 10/1998 | Focsaneanu et al. | 370/389 |
| 5,907,547 A | * | 5/1999 | Foladare et al. | 370/352 |
| 5,910,946 A | * | 6/1999 | Csapo | 370/328 |
| 5,918,019 A | * | 6/1999 | Valencia | 709/227 |
| 5,974,043 A | * | 10/1999 | Solomon | 370/352 |
| 5,991,292 A | * | 11/1999 | Focsaneanu et al. | 370/352 |
| 6,011,794 A | * | 1/2000 | Mordowitz et al. | 370/389 |
| 6,026,087 A | * | 2/2000 | Mirashrafi et al. | 370/389 |
| 6,064,653 A | * | 5/2000 | Farris | 370/238 |
| 6,069,890 A | * | 5/2000 | White et al. | 370/352 |
| 6,078,579 A | * | 6/2000 | Weingarten | 370/352 |
| 6,078,581 A | * | 6/2000 | Shtivelman et al. | 370/352 |
| 6,128,293 A | * | 10/2000 | Pfeffer | 370/353 |
| 6,181,690 B1 | * | 1/2001 | Civanlar | 370/352 |
| 6,208,638 B1 | * | 3/2001 | Rieley et al. | 370/354 |
| 6,243,373 B1 | * | 6/2001 | Turock | 370/352 |
| 6,272,126 B1 | * | 8/2001 | Strauss et al. | 370/352 |
| 6,295,357 B1 | * | 9/2001 | Staples et al. | 379/373.05 |
| 6,307,853 B1 | * | 10/2001 | Storch et al. | 370/354 |

FOREIGN PATENT DOCUMENTS

| | | |
|---|---|---|
| JP | 9-168033 | 6/1997 |
| JP | 9-168065 | 6/1997 |

* cited by examiner

Primary Examiner—Bob Phunkulh
(74) Attorney, Agent, or Firm—Staas & Halsey LLP

(57) ABSTRACT

In an Internet telephone system for implementing bilateral communication over the Internet between telephone sets and communication devices, by causing the telephone sets and the communication devices to connect to a repeater device via a public network so as to establish a communication channel on the Internet via the repeater device, each of the communication devices comprises: a connection unit for dialing one of a remote telephone set and a remote repeater device via the public network when a call is originated within the communication device or by a local telephone set connected to the communication device, so as to establish a connection; and a communication unit for performing data communication over the public network and over the Internet, wherein the repeater device is controlled by the connection unit and the communication unit to establish the communication channel on the Internet so that users of the local telephone set and the remote telephone set may perform speech communication over the Internet, using the same procedure as employed when the users perform speech communication over the public network.

18 Claims, 34 Drawing Sheets

INTERNET TELEPHONE SYSTEM

BACKGROUND OF THE INVENTION

1. Field of the Invention

The present invention generally relates to the Internet and, more particularly, to an Internet telephone system which uses the Internet for speech communication between telephone sets and computers.

2. Description of the Related Art

The Internet telephone system according to the related art using the Internet for communication between telephones and computers is implemented by a construction shown in FIG. 1 and FIG. 2.

FIG. 1 shows an Internet telephone system for enabling speech communication between computers.

Referring to FIG. 1, the Internet telephone system comprises a computer 101, a computer 102, a dedicated server 103, and an Internet 105. The dedicated server 103 has a management database (DB) 104 that centrally manages IP addresses of all the computers connected to the Internet 105.

For example, when the computer 101 connects to the computer 102, the computer 101 connects to the dedicated server 103 first, and confirms whether an IP address of the target computer 102 is registered in the management database 104. For example, the IP address information referred to in the confirmation may be a name with which the computer 102 is managed on a network.

The dedicated server 103 notifies the computer 101 of the IP address if it is registered in the management database 104, so that the computer 101 uses the IP address to connect to the computer 102 and communicate over the Internet 105. Each of the computers 101 and 102 should be provided with a microphone for speech communication with each other.

FIG. 2 shows an Internet telephone system which uses computers to enable telephone sets to perform speech communication.

Referring to FIG. 2, the Internet telephone system comprises a telephone set 111, a telephone set 112, a computer 113, a computer 114, and an Internet 117. The computer 113 and the computer 114 are provided with a management database 115 and a management database 116, respectively, to manage IP addresses of computers connected to Internet 117 and phone numbers of the telephone sets connected to the respective computers.

For example, the telephone set 111 connects to the nearest computer 113 in order to call the telephone set 112. The computer 113 executes a user authorization process for determining whether the telephone set 111 is qualified to use the Internet 117.

The telephone set 111 dials a phone number of the telephone set 112 when it is determined that the telephone set 111 is qualified to use the Internet. The computer 113 then connects to the computer 114 nearest the telephone set 112. The computer 114 connects to the telephone set 112 so as to enable speech communication over the Internet 117 between the telephone set 111 and the telephone set 112.

However, the Internet telephone system according to the related art is inconvenient in that it imposes a more complicated operation on a call originator than when an ordinary telephone set is used. More specifically, the call originator is required to register personal information in a managing computer located on a network.

SUMMARY OF THE INVENTION

Accordingly, an object of the present invention is to provide an Internet telephone system in which the aforementioned problems are eliminated.

Another and more specific object of the present invention is to provide an Internet telephone system whereby a user can operate a telephone set as any ordinary telephone set.

Still another object of the present invention is to provide an Internet telephone system which realizes low-cost speech communication using the Internet.

The aforementioned objects can be achieved by an Internet telephone system for implementing bilateral communication over the Internet between telephone sets and communication devices, by causing the telephone sets and the communication devices to connect to a repeater device via a public network so as to establish a communication channel on the Internet via the repeater device, wherein each of the communication devices comprises: connection means for dialing one of a remote telephone set and a remote repeater device via the public network when a call is originated within the communication device or by a local telephone set connected to the communication device, so as to establish a connection; and communication means for performing data communication over the public network and over the Internet, wherein the repeater device is controlled by the connection means and the communication means to establish the communication channel on the Internet so that users of the local telephone set and the remote telephone set may perform speech communication over the Internet, using the same procedure as employed when the users perform speech communication over the public network.

Each of the communication devices may further comprise: registering means for registering predetermined control information transmitted to and received from a remote communication device connected to the remote telephone set; and information storage means for storing the control information registered by the registering means, wherein the connection means and the communication means may control the repeater device in accordance with the control information.

Each of the communication devices may further comprise: monitoring means for monitoring communication data on the Internet while an Internet call using the Internet is proceeding; and switching means for switching the Internet call using the Internet to a public circuit call using the public network, when it is determined that a predetermined transfer rate for the communication data fails to be guaranteed.

Each of the communication devices may comprise activating means for automatically activating hardware and software necessary for a call, when it is determined upon origination of a call by a telephone set on an originating side that a main power supply of the communication device is on but the necessary hardware and the software are not activated.

Each of the communication devices may comprise converting means for converting analog data output from a telephone set on an originating side into digital data, and converting digital data into analog data to be supplied to a destination telephone set.

The repeater device may comprise conversation data storage means for storing received conversation data when the received conversation data cannot be transmitted to the communication device.

The aforementioned objects can also be achieved by a communication device for an Internet telephone system for implementing bilateral communication over the Internet, by connecting to a telephone set and connecting to a repeater device via a public network, the communication device comprising: connection means for dialing one of a remote telephone set and a remote repeater device via the public network when a call is originated by a local telephone set connected to the communication device, so as to establish a connection; and communication means for performing data communication over the public network and over the Internet, wherein the repeater device is controlled by the connection means and the communication means to establish a communication channel on the Internet so that users of the local telephone set and the remote telephone set may perform speech communication over the Internet, using the same procedure as employed when the users perform speech communication over the public network.

The communication device may further comprise: registering means for registering predetermined control information transmitted to and received from a remote communication device connected to the remote telephone set; and information storage means for storing the control information registered by the registering means, wherein the connection means and the communication means may control the repeater device in accordance with the control information.

The communication device may further comprise: monitoring means for monitoring communication data on the Internet while an Internet call using the Internet is proceeding; and switching means for switching the Internet call using the Internet to a public circuit call using the public network, when it is determined that a predetermined transfer rate for the communication data fails to be guaranteed.

The communication device may further comprise: activating means for automatically activating hardware and software necessary for a call, when it is determined upon origination of a call by a telephone set on an originating side that a main power supply of the communication device is on but the necessary hardware and the software are not activated.

The communication device may further comprise converting means for converting analog data outputted from a telephone set on an originating side into digital data, and converting digital data into analog data to be supplied to a destination telephone set.

The aforementioned objects can also be achieved by a repeater device for an Internet telephone system for implementing bilateral communication over the Internet, by connecting to telephone sets and communication devices via a public network, comprising conversation data storage means for storing received conversation data when the received conversation data cannot be transmitted to a communication device.

The aforementioned objects can also be achieved by a machine-readable recording medium storing a program for implementing bilateral communication over the Internet between telephone sets and communication devices, by causing the telephone sets and the communication devices to connect to a repeater device via a public network so as to establish a communication channel on the Internet via the repeater device, the program comprising the steps of: causing a communication device to dial one of a remote telephone set and a remote repeater device via the public network when a call is originated by one of a local telephone set and the communication device, so as to establish a connection; and causing the communication device to perform data communication over the public network and over the Internet, the repeater device being controlled by the steps to establish the communication channel on the Internet so that users of the local telephone set and the remote telephone set may perform speech communication over the Internet, using the same procedure as employed when the users perform speech communication over the public network.

The program may further comprise the steps of: causing the communication device to register predetermined control information transmitted to and received from a remote communication device connected to the remote telephone set; and storing the control information registered in the above step.

The program may further comprise the steps of: monitoring communication data on the Internet while an Internet call using the Internet is proceeding; and switching the Internet call using the Internet to a public circuit call using the public network, when it is determined that a predetermined transfer rate for the communication data fails to be guaranteed.

The program may further comprise the steps of automatically activating hardware and software necessary for a call, when it is determined upon origination of a call by a telephone set on an originating side that a main power supply of the communication device is on but the necessary hardware and the software are not activated.

The program further may comprise the steps of converting analog data output from a telephone set on an originating side into digital data, and converting digital data into analog data to be supplied to a destination telephone set.

BRIEF DESCRIPTION OF THE DRAWINGS

Other objects and further features of the present invention will be apparent from the following detailed description when read in conjunction with the accompanying drawings, in which.

DETAILED DESCRIPTION OF THE EMBODIMENTS

Figure 4:
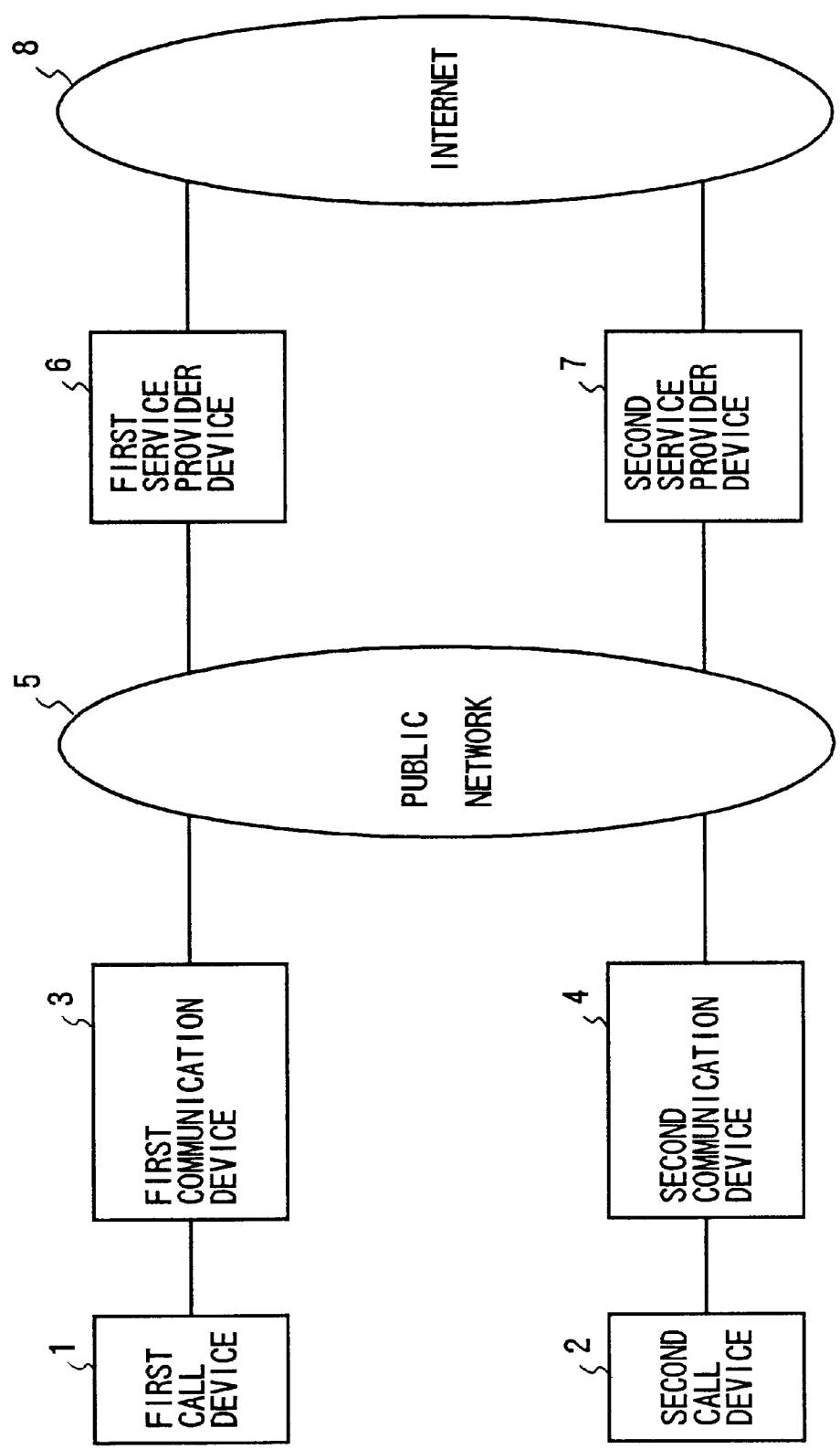
FIG. 4 shows a principle and construction of an Internet telephone system according to the present invention.

FIG. 4 shows a principle and construction of the Internet telephone system of the present invention.

Referring to FIG. 4, the Internet telephone system comprises a first call device 1, a second call device 2, a first communication device 3, a second communication device 4, a first repeater device 6 and a second repeater device 7. Each of the first call device 1 and the second call device 2 is implemented by a telephone set. The first communication device 3 is implemented by a computer which performs necessary connection and communication processes so that the first call device 1 can perform bilateral communication over a public network 5. The second communication device 4 is implemented by a computer which performs necessary connection and communication processes so that the second call device 2 can perform bilateral communication over the public network 5. Each of the first repeater device 6 and the second repeater device 7 is implemented by a service provider which uses the public network 5 as a connection medium for connecting to communication devices and performs necessary connection and communication processes for bilateral communication over an Internet 8.

For example, when a phone number for the second call device 2 is input by a user of the first call device 1, the first communication device 3 transmits and receives information that enables communicating over the Internet 8, to and from the second communication device 4 via the public network 5.

The first communication device 3 and the second communication device 4, which transmit and receive the information, connect to the first repeater device 6 and the second repeater device 7, respectively, in accordance with the information. The first repeater device 6 and the second repeater device 7 are connected to each other over the Internet 8. In this state, conversation data from the first call device 1 and the second call device 2 can travel over the Internet.

The first communication device 3 and the second communication device 4 have facilities to automatically switch from the communication using the Internet 8 to the communication using the public network 5 when it becomes impossible to guarantee a predetermined transmission rate on the Internet 8.

Figure 5:
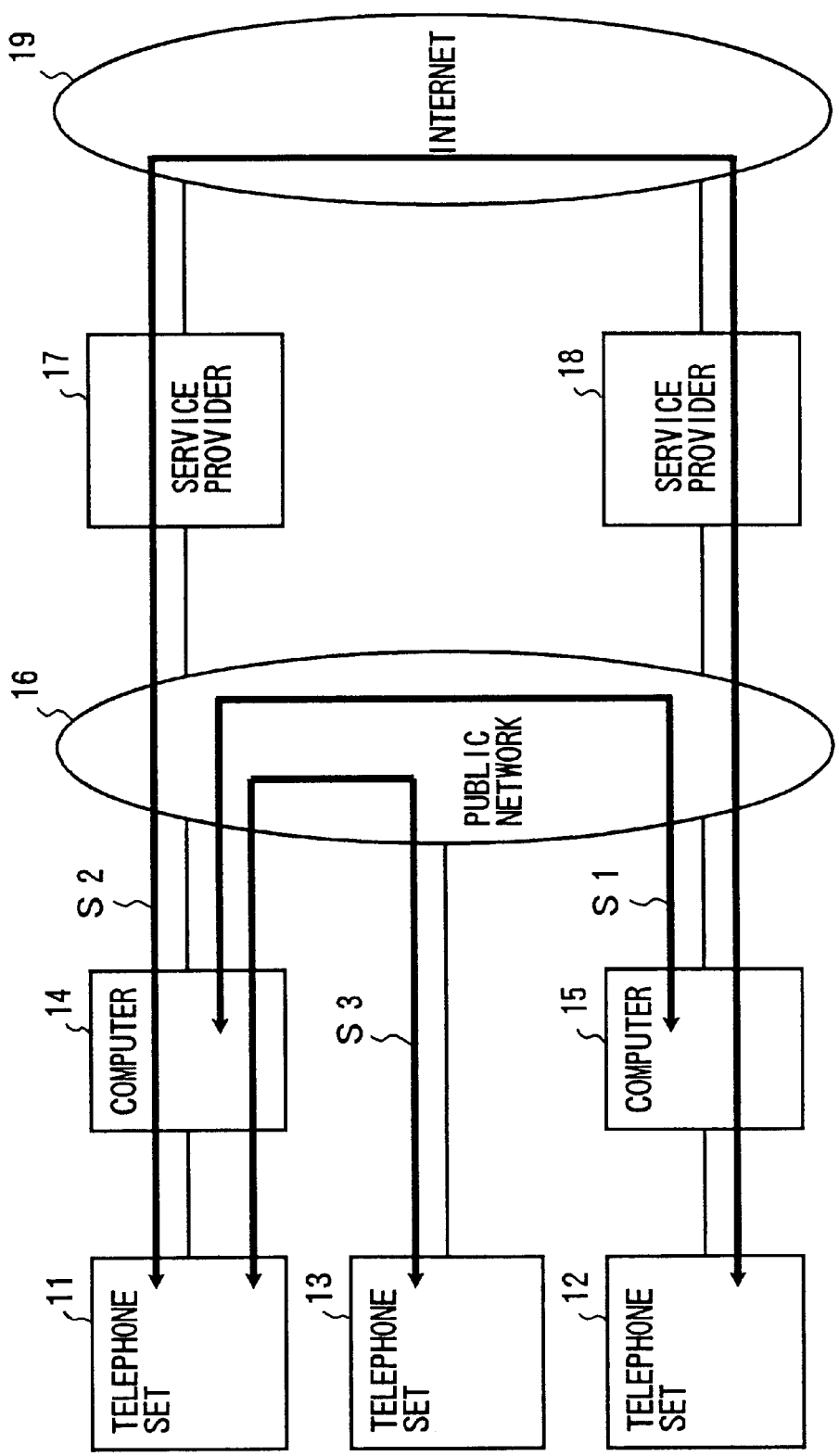
FIG. 5 shows a constitution and operation of the Internet telephone system according to the present invention.

FIG. 5 shows a construction and an operation of the Internet telephone system which uses the principle and the construction shown in FIG. 4.

Referring to FIG. 5, the Internet telephone system comprises a telephone set 11, a telephone set 12, a telephone set 13, a computer 14, a computer 15, a service provider 17, and a service provider 18. The computer 14 performs necessary connection and communication processes so that the telephone set 11 can perform bilateral communication over a public network 16. The computer 15 performs necessary connection and communication processes so that the telephone set 12 can perform bilateral communication over the public network 16. The service provider 17 and the service provider 18 use the public network 16 as a connection medium for connecting to computers, and perform necessary connection and communication processes to enable bilateral communication over an Internet 19.

When a user of the telephone set 11 performs a dialing process to call the telephone set 12 in the Internet telephone system constructed as above, the computer 14 connected to the telephone set 11 communicates with the computer 15 connected to the telephone set 12, so as to transmit and receive respective phone numbers and IP addresses over the public network 16 (S1).

The computer 14 connects to the nearest service provider 17 over the public network 16. The service provider 17 receives an IP address of a call destination and connects to the service provider 18 over the Internet 19. The service provider 18 connects to the computer 15 connected to the telephone set 12, over the public network 16. In this state, the telephone set 11 and the telephone set 12 can perform speech communication as in any ordinary telephone call (S2). Release of the network 16 and the Internet 19 after the conversation is performed in one of the telephone sets which is the first to be placed in an on-hook state.

When a dialing process is performed by a user of the telephone set 11 to call the telephone set 13 to which no computer is connected, the computer 14 connected to the telephone set 11 communicates with the telephone set 13 so as to transmit and receive respective phone numbers and IP addresses over the public network 16 but fails because the telephone set 13 is not connected to a computer.

With this failure, the computer 14 recognizes that a computer is not connected to the telephone set 13, and that it is possible to perform speech communication with the telephone set 13 over the public network 16. Therefore, conversation data from the telephone set 11 and the telephone set 13 is transmitted and received via the computer 14, so that the telephone set 11 and the telephone set 13 can perform speech communication as in any ordinary telephone call (S3).

It is to be noted that conversation over the public network 16 is possible as in any ordinary telephone call when a telephone set on the originating side is not connected to a computer.

A detailed construction of the Internet telephone system shown in FIG. 5 and the control of signals therein will be explained with reference to FIGS. 6-24.

Figure 6:
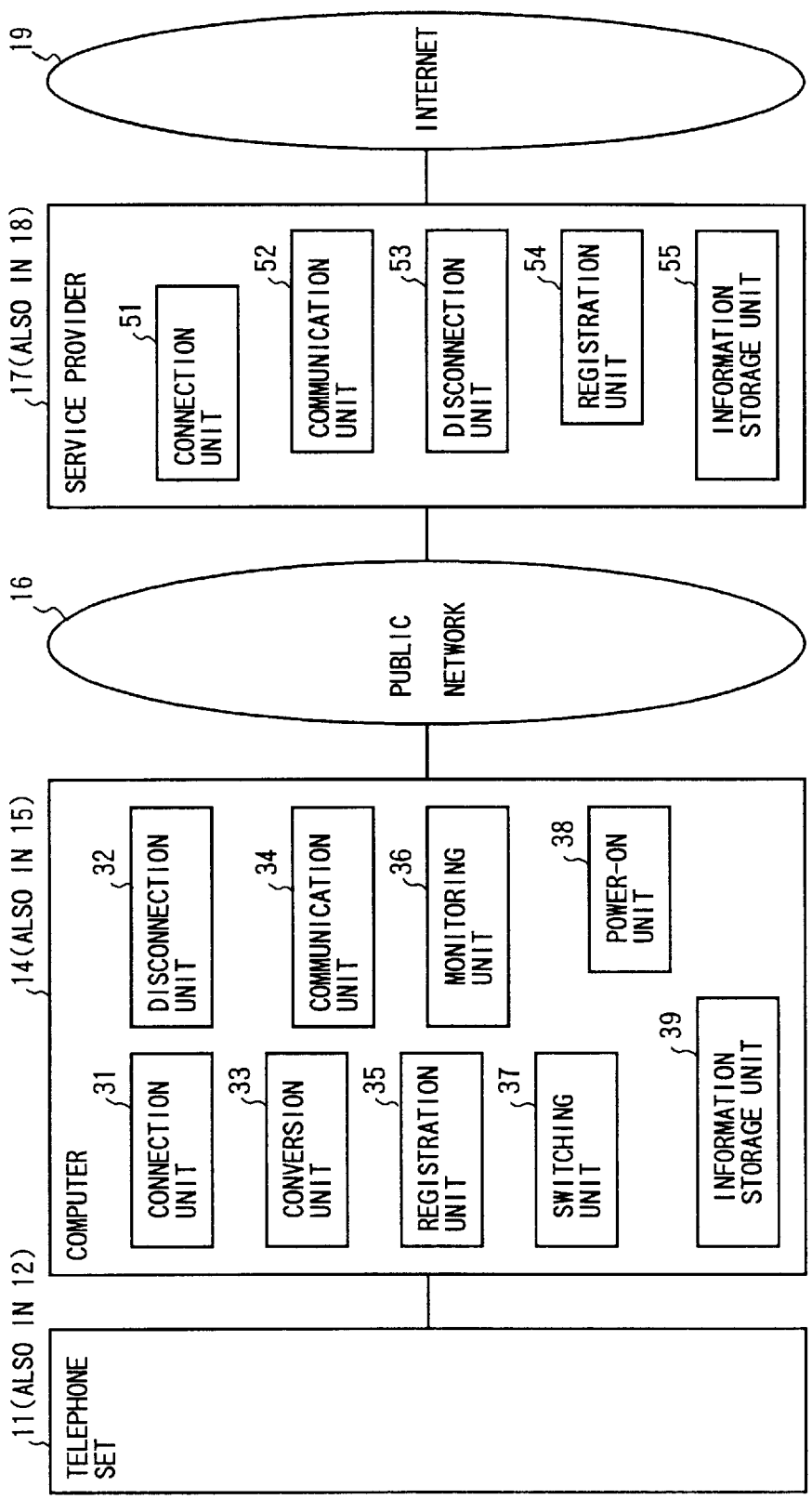
FIG. 6 shows a construction of the Internet telephone system.

FIG. 6 shows a detailed construction of the Internet telephone system of the present invention.

Referring to FIG. 6, the Internet telephone system constructed as shown in FIG. 5 comprises the telephone set 11, the computer 14, the public network 16, the service provider 17 and the Internet 19. The computer 14 comprises a connection unit 31, a disconnection unit 32, a conversion unit 33, a communication unit 34, a registering unit 35, a monitoring unit 36, a switching unit 37, a power-on unit 38, and an information storage unit 39. The computer 14 communicates with other computers and service providers over the public network 16. The detailed construction of the computer 15 to be described later is the same as the construction of the computer 14.

The service provider 17 comprises a connection unit 51, a communication unit 52, a disconnection unit 53, a registering unit 54, and an information storage unit 55. With this construction, transmission and reception of conversation data using the Internet 19 is made possible. The detailed construction of the service provider 18 to be described later is the same as that of the service provider 17.

When the telephone set 11 transmits a phone number in the Internet telephone system constructed as in FIG. 6, the connection unit 31 of the computer 14 connects to a computer connected to a call destination telephone set (hereinafter, a call destination computer) over the public network 16 and also connects to the service provider 17 over the public network 16.

The disconnection unit 32 provides facilities for terminating a connection with the call destination computer, and also for terminating a connection with the service provider 17 connected to the computer 14 via the public network 16.

The conversion unit 33 provides facilities to perform digital/analog conversion of conversation data between the telephone set 11 and the destination computer.

The communication unit 34 provides facilities to exchange conversation data and control data with the call destination computer, over the public network 16. Moreover, the communication unit 34 provides facilities to perform a similar communication with the service provider 17 over the public network 16.

The registering unit 35 provides facilities for receiving information from the call destination computer, over the public network 16.

For example, the registering unit 35 receives a phone number and an IP address and registers the same in the information storage unit 39 to be described later.

The monitoring unit 36 provides facilities for monitoring whether the Internet 19 is not loaded to such an extent that a predetermined transmission rate cannot be guaranteed. More specifically, the monitoring unit 36 monitors the traffic so as to determine whether the transmission rate is lowered to such an extent that a call originator and a call recipient engaged in a telephone call feel uncomfortable.

The switching unit 37 provides facilities for automatically switching from the communication using the Internet 19 to the communication using the public network 16, when the predetermined transmission rate of the Internet 19 fails to be guaranteed.

The power-on unit 38 provides facilities for automatically turning on a power supply of the computer 14, when the power supply of the computer 14 is not on when it is called by a call origination telephone set.

The information storage unit 39 provides facilities for storing information to control a call destination telephone set. For example, the information storage unit 39 stores a phone number and an IP address.

In the Internet telephone system constructed as shown in FIG. 6, the connection unit 51 of the service provider 17 provides facilities for connecting over the Internet 19 to the service provider connected to a call destination computer (hereinafter, a call destination service provider).

The disconnection unit 53 provides facilities for terminating a connection with the call destination service provider connected over the Internet 19.

The communication unit 52 provides facilities for transmitting and receiving, over the Internet 19, conversation data and control data to and from the call destination service provider. The communication unit 52 also provides facilities for transmitting and receiving conversation data and control data to and from the computer 14 over the public network 16.

The registering unit 54 provides facilities for registering conversation data received from a call destination telephone set in the information storage unit 55 to be described later, when the conversation data fails to be transmitted to the computer 14.

The information storage unit 55 provides facilities for storing the conversation data which has failed to be transmitted to the computer 14. The conversation data thus stored can be reproduced subsequently.

The Internet telephone system constructed as shown in FIG. 6 may be constructed such that the computer 14 is built into the telephone set 11. In this case, the computer 14 is not a prerequisite.

For example, the public network 16 may be an analog telephone line, a digital telephone line, a CATV (cable television), or a satellite line.

The service provider 17 is indispensable in order to use the Internet 19.

Figure 7:
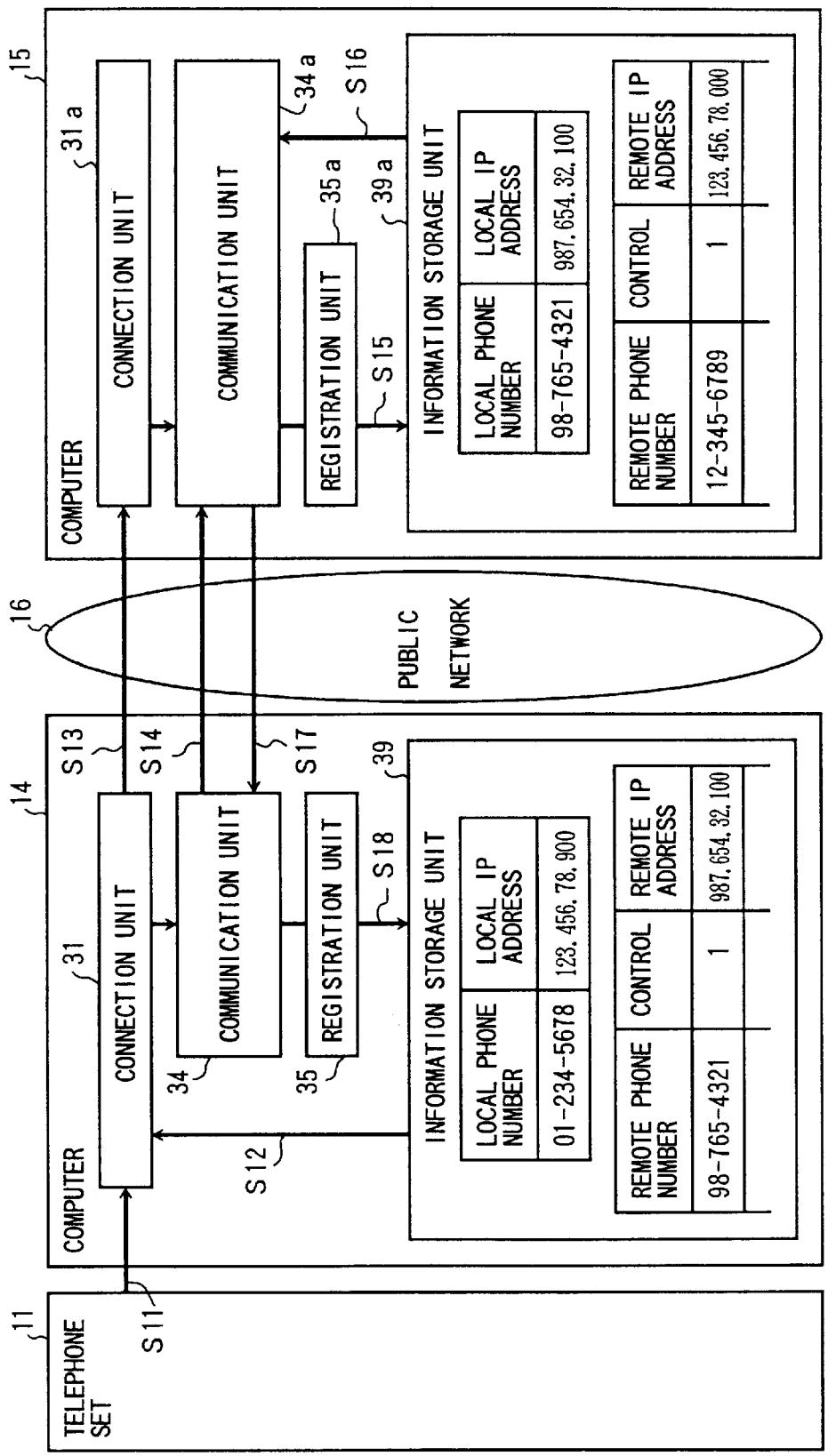
FIG. 7 shows an operation whereby information is exchanged between computers.

FIG. 7 shows an operation to transmit and receive information between the computer 14 and the computer 15 in the Internet telephone system shown in FIG. 5. In transmission and reception of information between the computer 14 and the computer 15, the connection unit 31, the communication unit 34, the registering unit 35 and the information storage unit 39 of the computer 14 shown in FIG. 6 operate. As for the computer 15, a connection unit 31a, a communication unit 34a, a registering unit 35a and a information storage unit 39a, respectively having the same facilities as the equivalent units of the computer 14, operate.

When a user of the telephone set 11 dials a phone number of the call destination telephone set connected to the computer 15 (S11), the connection unit 31 of the computer 14 searches the information storage unit 39 to determine whether a phone number and an IP address of the destination are registered therein (S12).

When the phone number and the IP address are registered, transmission and reception of information are not performed between the computer 14 and the computer 15.

When the phone number and the IP address are not registered, the connection unit 31 of the computer 14 dials the connection unit 31a of the computer 15 over the public network 16 (S13). With this, a communication as in any ordinary telephone call becomes possible when the dialing is successful. Subsequently, the communication unit 34 of the computer 14 requests an IP address from the communication unit 34a of the computer 15 (S14). The communication unit 34 simultaneously notifies the communication unit 34a of the phone number and the IP address of the telephone set 11 managed by the information storage unit 39.

When the communication unit 34a has received the phone number and the IP address, the registering unit 35a registers the phone number and the IP address in the information storage unit 39a (S15).

The communication unit 34a reads out the phone number and the IP address of the telephone set 12 registered in the information storage unit 39a (S16) and reports the phone number and the IP address thus read out to the communication unit 34 (S17). When the communication unit 34 receives the phone number and the IP address of the telephone set 12, the registering unit 35 registers the phone number and the IP address in the information storage unit 39 (S18). The information registered in the information storage unit 39 and the information storage unit 39a are managed and used as information necessary in the speech communication over the Internet 19.

Figure 8:
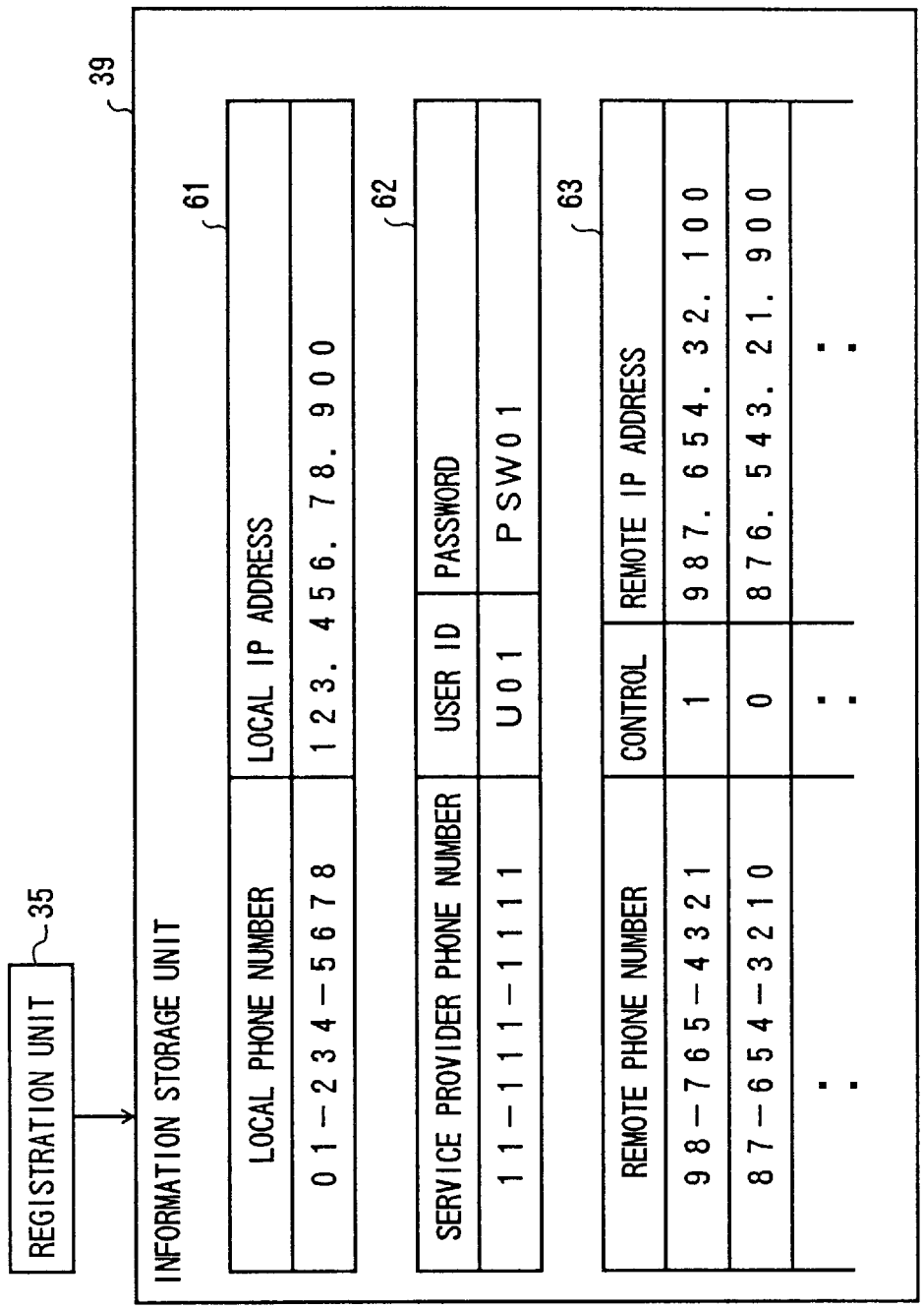
FIG. 8 shows an example of information managed by an information storage unit.

FIG. 8 shows an example of information managed by the information storage unit 39 and the information storage unit 39a of the present invention.

For example, the information managed by the information storage unit 39 comprises network information 61 of the telephone set 11, service provider information 62 and destination network information 63 of a call destination telephone set. Storage in the information storage unit 39 is controlled by the registering unit 35. The information managed by the information storage unit 39a comprises network information of the telephone set 12, service provider information, and destination network information of the call destination telephone set. Storage in the information storage unit 39a is controlled by the registering unit 35a.

The network information 61 of the telephone set 11 is used in order to manage a phone number and an IP address of the telephone set 11.

The service provider information 62 is used in order to manage a phone number, a user ID and a user authentification password to access a service provider.

The destination network information 63 is used to manage a phone number and an IP address of a call destination telephone set. The destination network information 63 is also used to determine whether the Internet connection is used or the ordinary public line is used to connect to the call destination telephone set. For example, information '1' and '0' is managed.

Figure 9:
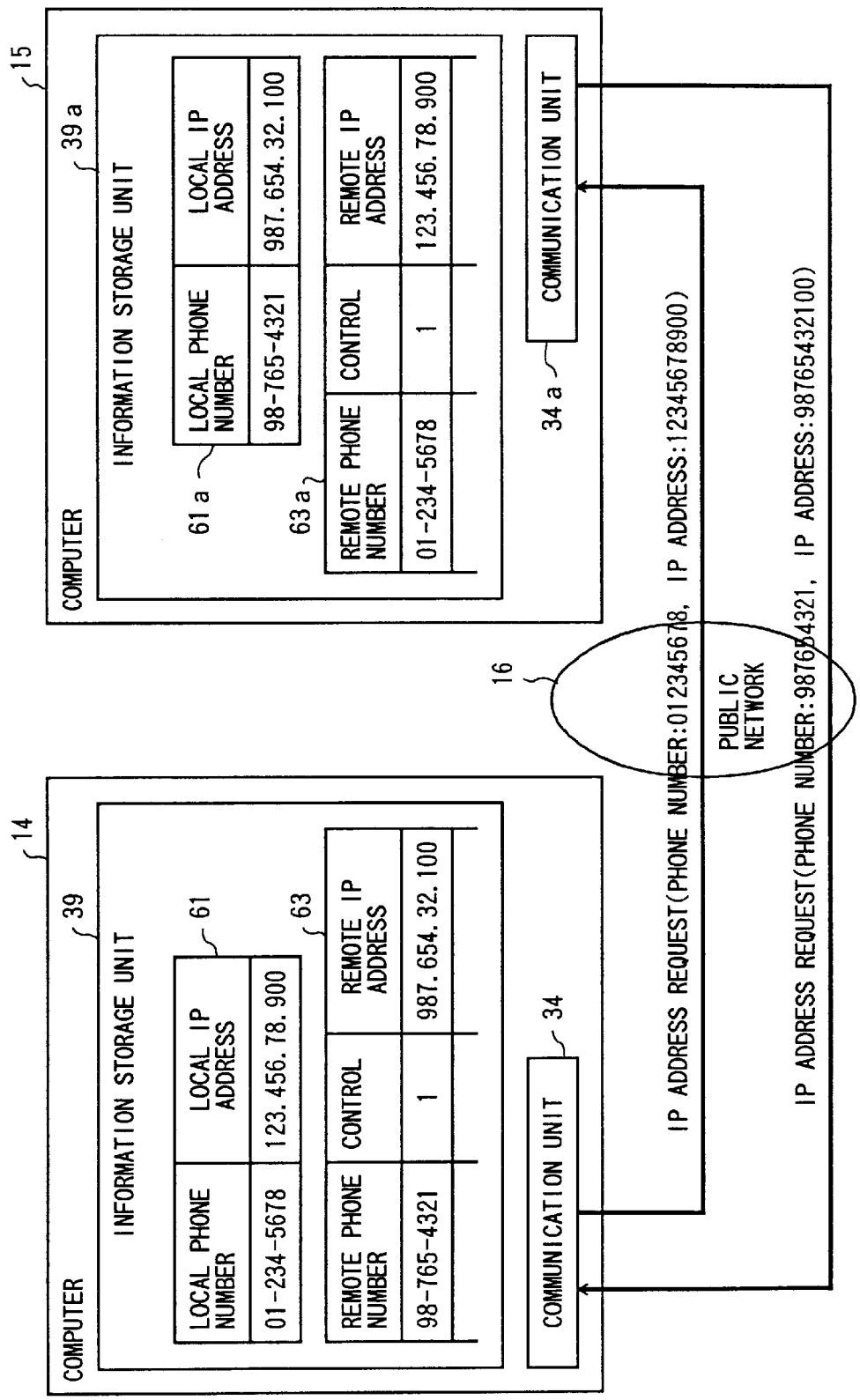
FIG. 9 shows an example of information exchanged between computers.

FIG. 9 shows an example of information transmitted and received over the public network 16 between the computer 14 and the computer 15.

The communication unit 34 of the computer 14 requests an IP address from the communication unit 34a and simultaneously reads out a phone number '012345678' and an IP address '12345678900' of the telephone set 11 from the network information 61 registered in the information storage unit 39, and notifies the communication unit 34a of the information thus read out.

The communication unit 34a which receives the information described above registers the information as destination network information 63a, reads out a phone number '987654321' and an IP address '98765432100' of the telephone set 12 from network information 61a registered in the information storage unit 39a and notifies the communication unit 34 of the information. The communication unit 34 which receives the phone number and the IP address from the communication unit 34a registers the information in the information storage device 39.

Figure 10:
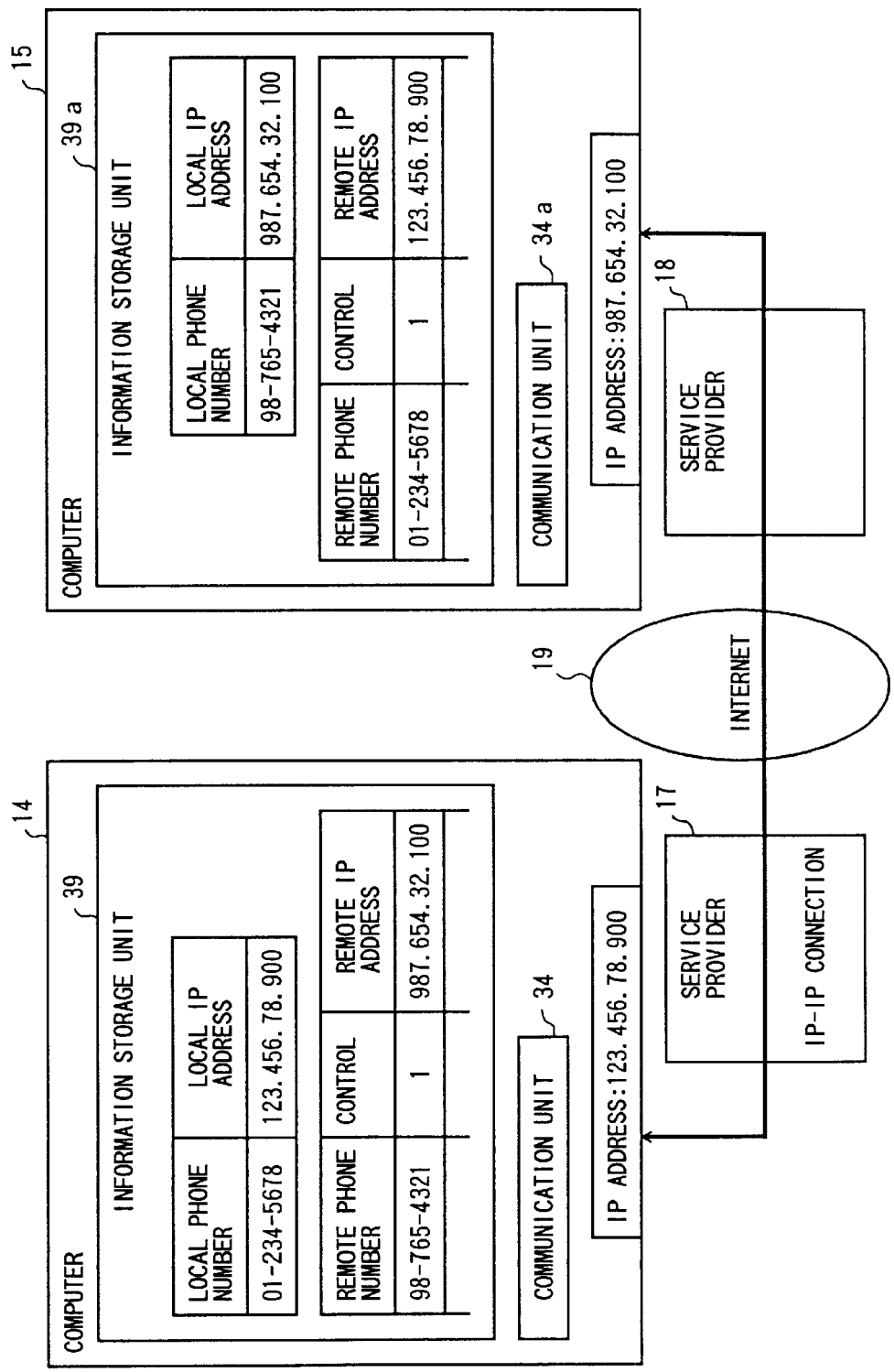
FIG. 10 shows control executed between computers.

FIG. 10 shows the control performed when an IP Internet connection is established between the computer 14 and the computer 15 in the Internet telephone system shown in FIG. 5.

In this case, each of the computer 14 and the computer 15 has a native IP address. Moreover, the information storage unit 39 stores an IP address of the computer 15 and the information storage unit 39a stores an IP address of the computer 14. In this state, the computer 14 establishes an IP connection to the Internet 19 through the service provider 17, and the computer 15 establishes an IP connection to the Internet 19 through the service provider 18. The computers 14 and 15 supply various control data over this communication path.

Figure 11:
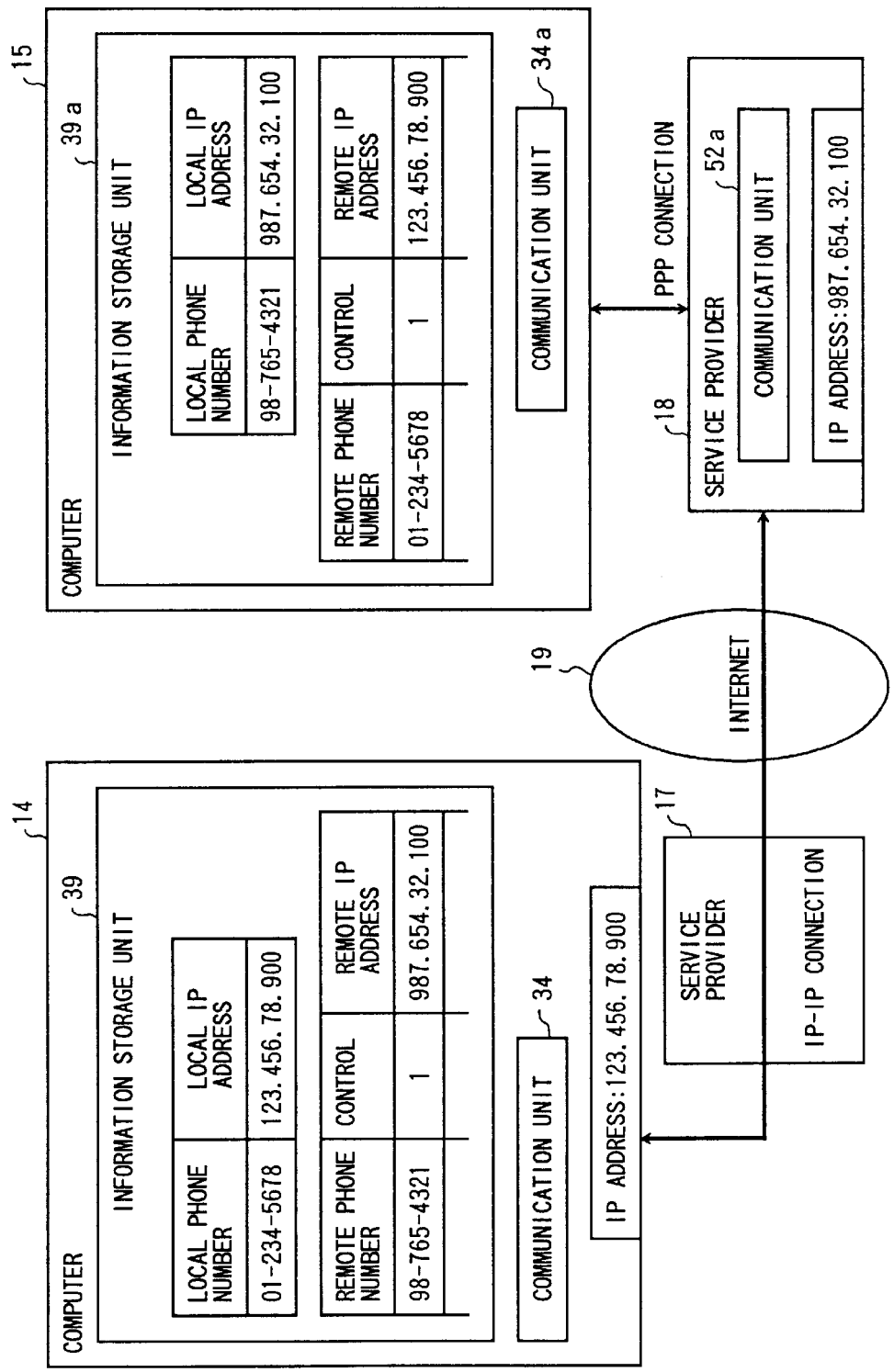
FIG. 11 shows control executed between computers.

FIG. 11 shows the control performed in the Internet telephone system shown in FIG. 5, in a case where the computer 14 establishes an IP connection to the Internet, and the computer 15 establishes a dial-up connection to the Internet.

In this case, the computer 14 has a native IP address, and the computer 15 does not have a native IP address. The service provider 18 to which the computer 15 is connected has an IP address. In this state, the communication unit 34 of the computer 14 connects to the service provider 18 over the Internet 19 through the service provider 17. A PPP connection that uses the public network is established between the communication unit 34a of the computer 15 and a communication unit 52a of the service provider 18. The computer 14 and the computer 15 supply various control data over this communication path.

Figure 12:
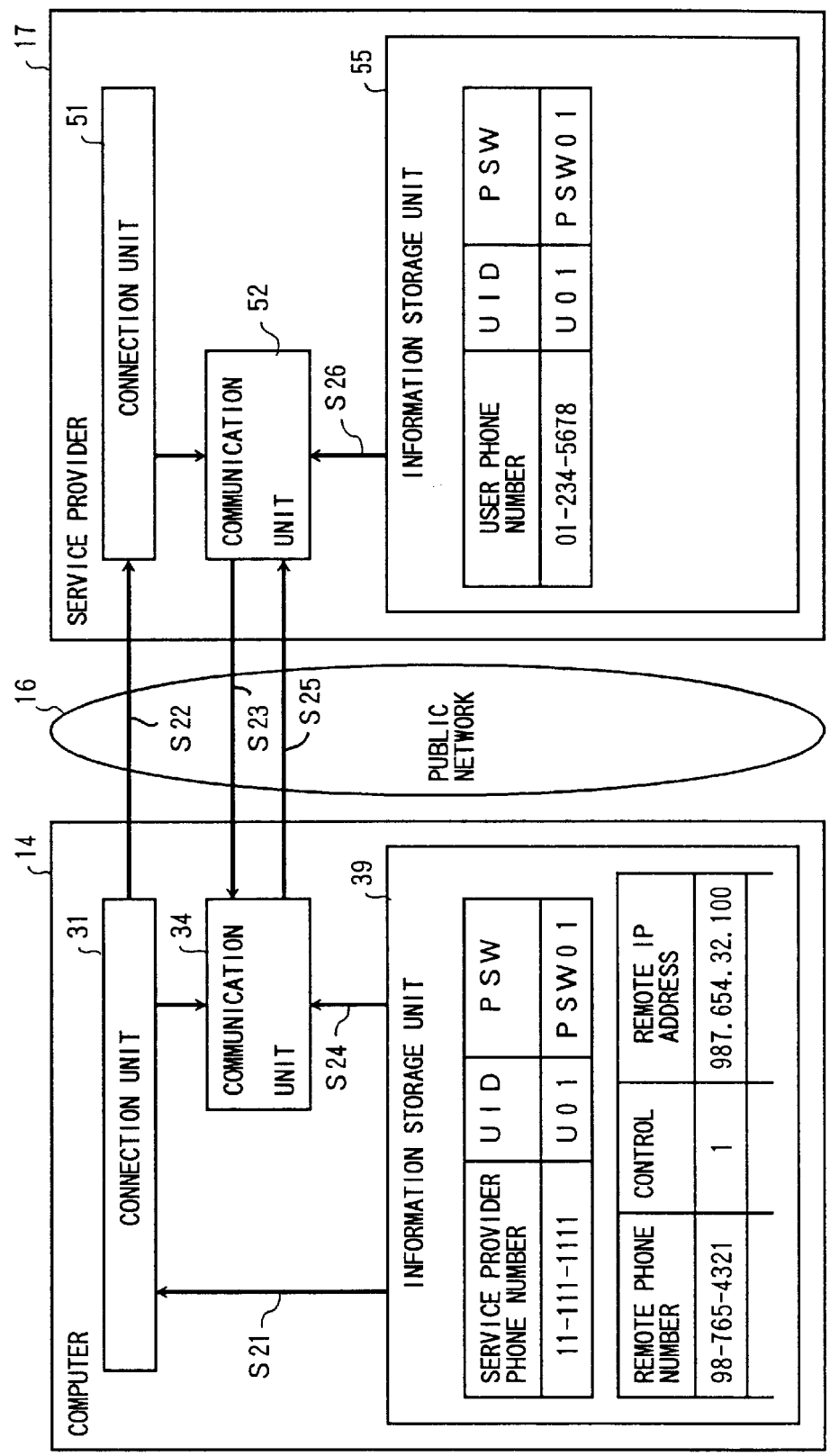
FIG. 12 shows an operation performed between an originating computer and a service provider.

FIG. 12 shows an operation performed in the Internet telephone system shown in FIG. 5 for transmitting and receiving information over the public network 16 between the computer 14 and the service provider 17 on the originating side. In transmission and reception of information between the computer 14 and the service provider 17, the connection unit 31, the communication unit 34, the information storage unit 39 of the computer 14 shown in FIG. 6 operate, and the connection unit 51, the communication unit 52 and information storage unit 55 of the service provider 17 operate.

For example, the connection unit 31 of the computer 14 reads out '11-111-1111' as a service provider phone number registered in the information storage unit 39 (S21), and dials the connection unit 51 of the service provider 17 (S22).

The communication unit 52 of the service provider 17 requests a user ID and a password of the computer 14 from the communication unit 34 in order to authenticate a user (the computer 14) (S23). In response to the demand for the user ID and the password, the communication unit 34 of the computer 14 reads out a user ID and a password registered in the information storage unit 39. The communication unit 34 also reads out a destination telephone number and a destination IP address (S24). For example, the communication unit 34 reads out an ID 'U01', a password 'PSW01', a destination phone number '98-765-4321' and a destination IP address '987.654.32.100' and notifies the communication unit 52 of the service provider 17 accordingly (S25). Simultaneously, the communication unit 34 notifies the communication unit 52 of the telephone number and the IP address of the computer 14.

In this state, the communication unit 52 examines the user ID and the password registered in the information storage unit 55 (S26). When the passwords match and the user IDs match, the communication unit 52 permits an Internet connection. The communication unit 52 refuses a demand of access from a user (the computer 14) when the passwords and the user IDs do not match.

Figure 13:
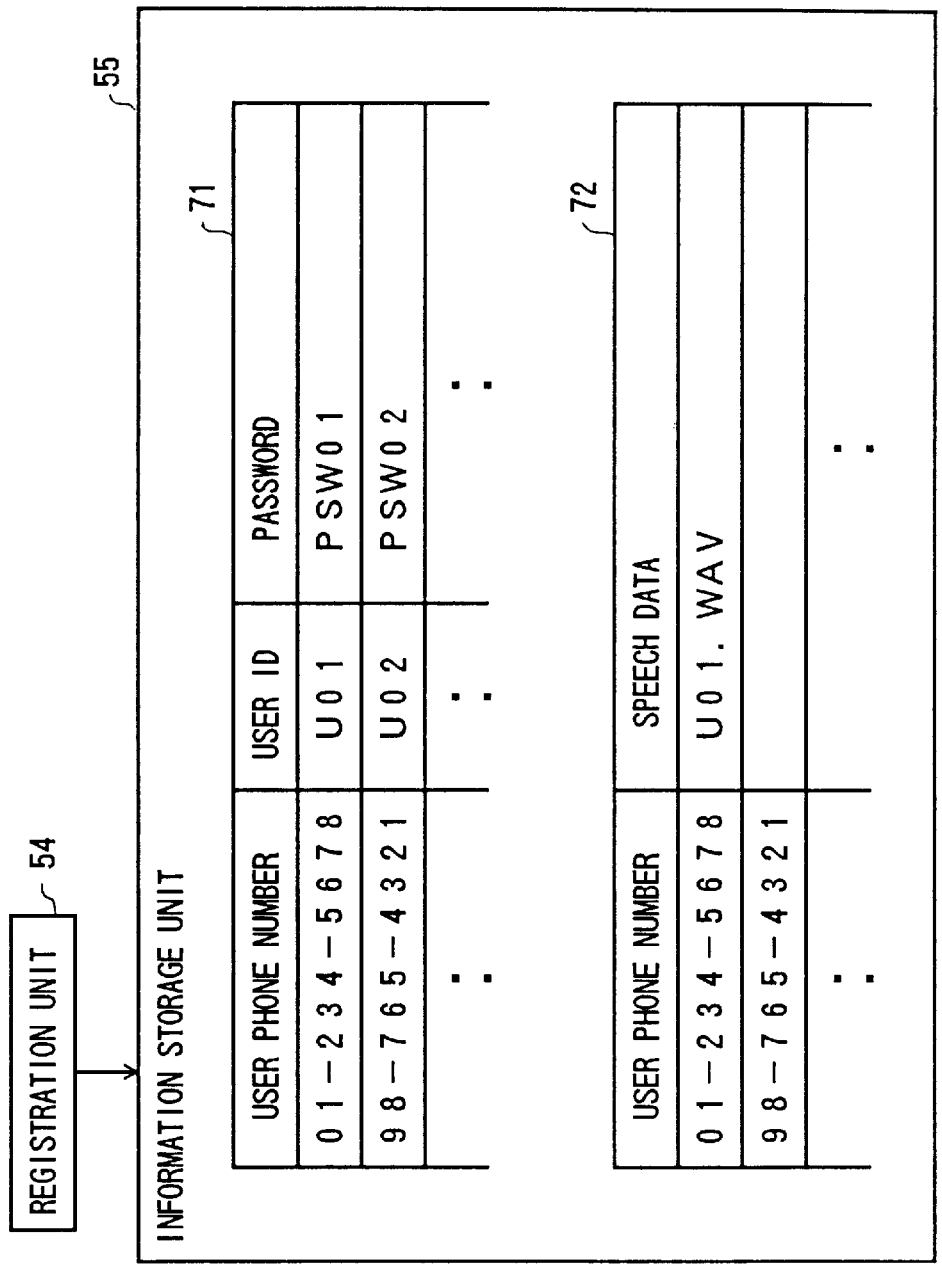
FIG. 13 shows an example of information stored by an information storage unit.

FIG. 13 shows an example of information managed by the information storage unit 55 referred to when the service provider 17 examines the registered user ID and password.

Information managed by the information storage unit 55 comprises provider connection information 71 and answer phone information 72. Storage of information in the information storage unit 55 is controlled by the registering unit 54 of the service provider 17 shown in FIG. 6.

The provider connection information 71 registered in the information storage unit 55 is used to manage a user phone number, a user ID and a password to authenticate a user of the service provider. For example, a phone number '01-234-5678', a user ID 'U01', and a password 'PSW01' are managed.

In the answer phone information 72, 'U01.WAV', for example, is managed as sound data corresponding to a user phone number '01-234-5678'.

Figure 14:
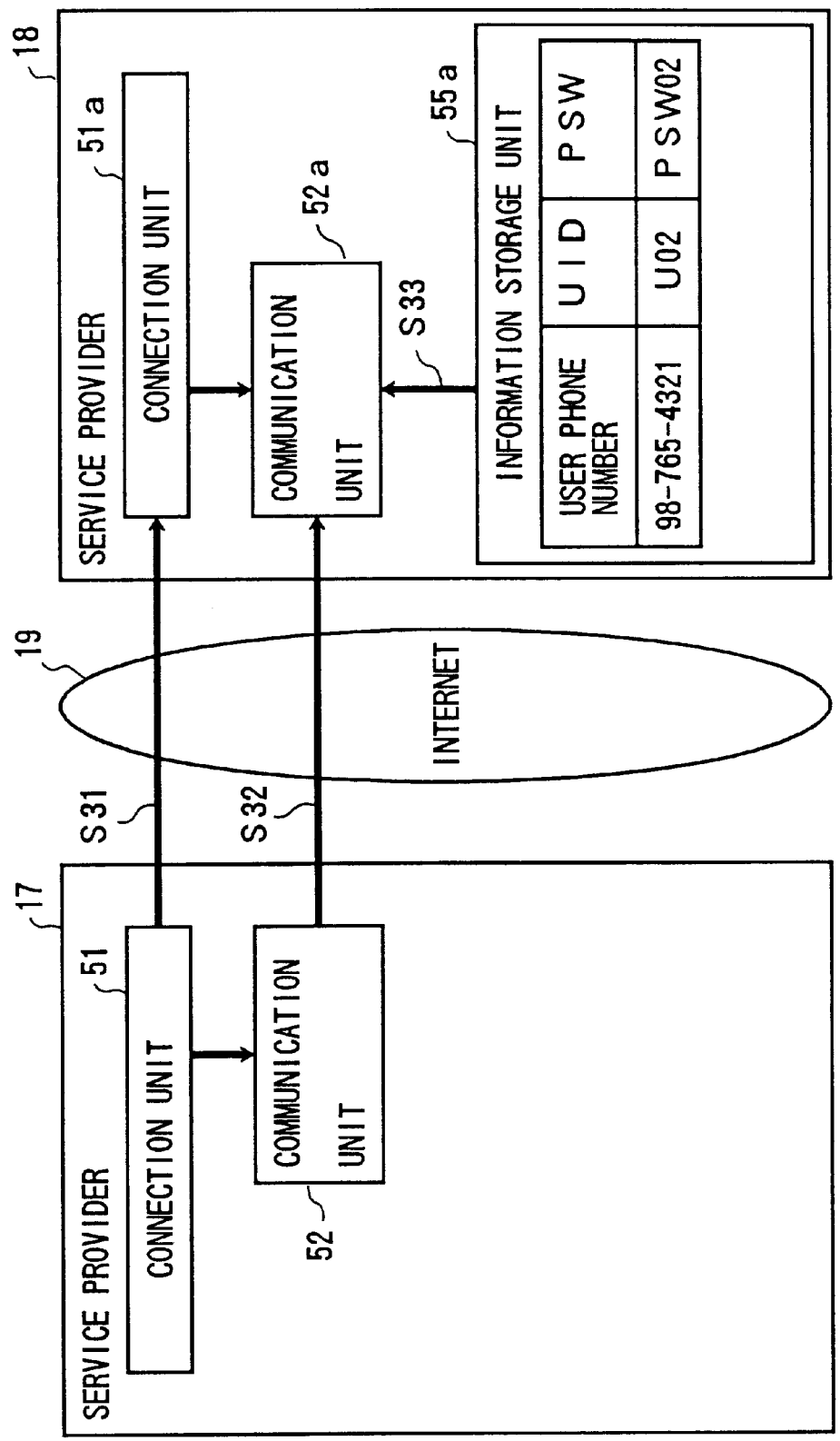
FIG. 14 shows an operation performed between service providers.

FIG. 14 shows an operation for transmitting and receiving information between the service provider 17 on the originating side 17 and the service provider 18 on the receiving side in the Internet telephone system shown in FIG. 5. In transmission and reception of information over the Internet 19 between the service provider 17 and the service provider 18, the connection unit 51 and the communication unit 52 of the service provider 17 operate, and a connection unit 51a, a communication unit 52a and an information storage unit 55a of the service provider 18 operate. The connection unit 51a, the communication unit 52a and the information storage unit 55a have the same facilities as the equivalent units of the service provider 17.

Using the IP address received from the computer 14 on the originating side shown in FIG. 5, the connection unit 51 of the service provider 17 on the originating side 17 establishes an IP-IP connection with the connection unit 51a of the service provider 18 on the receiving side (S31).

The communication unit 52 notifies the communication unit 52a of the service provider 18 of a phone number and an IP address of the computer 14 on the originating side. Further, the communication unit 52 supplies a phone number and an IP address of the recipient to the communication unit 52a (S32).

The communication unit 52a receiving the information from the communication unit 52 examines the information so as to determine whether the received phone number is registered in the information storage unit 55a (S33). When the phone number is registered, the connection unit 51a performs a connection process with respect to the computer 15 on the receiving side. When the phone number is not registered, a request from the service provider 17 may be refused. The examination process of step 33 is not indispensable.

Figure 15:
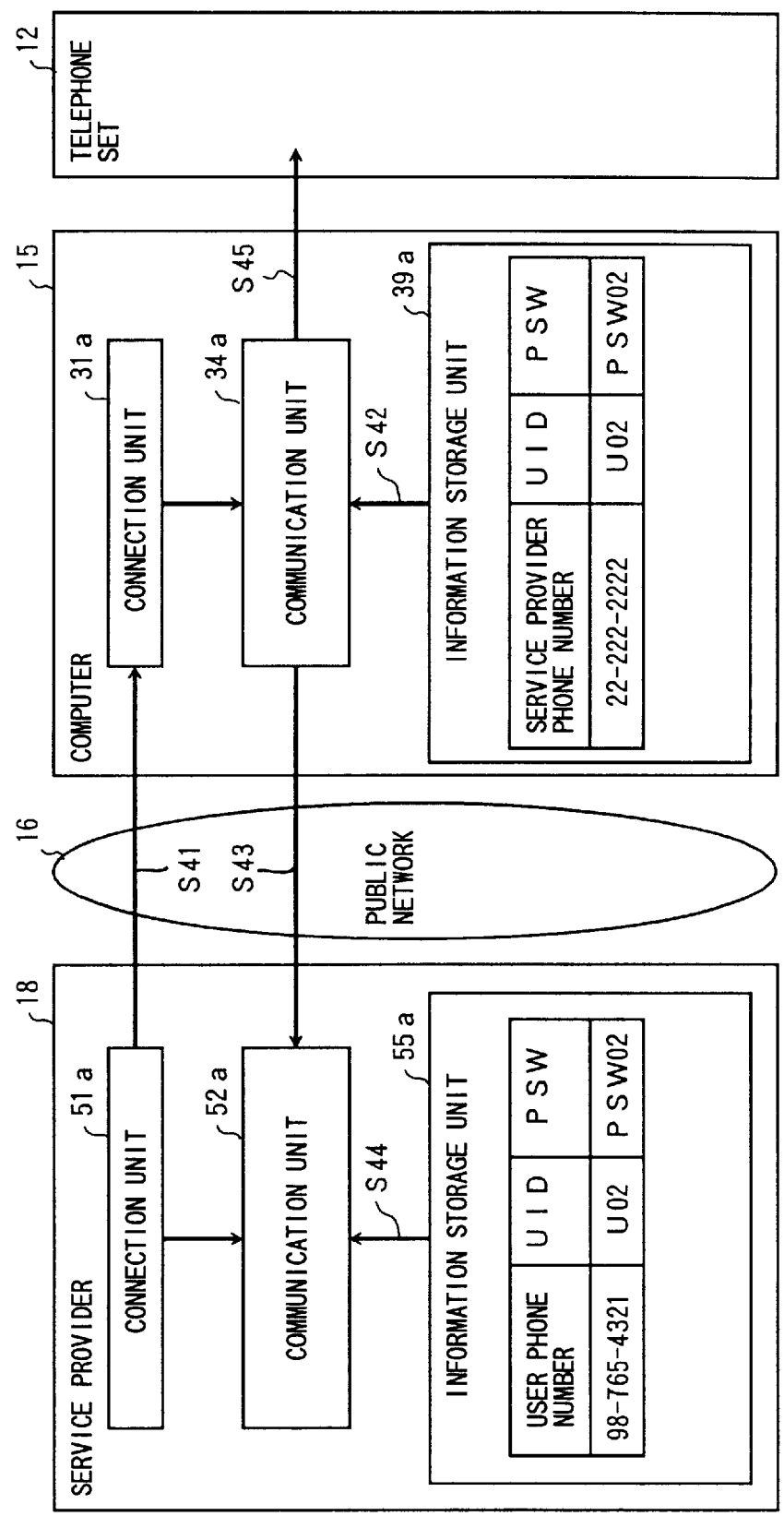
FIG. 15 shows an operation performed between a service provider on the receiving side and a computer.

FIG. 15 shows an operation for transmitting and receiving information over the public network 16 between the service provider 18 on the receiving side and the computer 15 on the receiving side in the Internet telephone system shown in FIG. 5. In transmission and reception of information between the service provider 18 and the computer 15, the connection unit 51a, the communication unit 52a and the information storage unit 55a of the service provider 18 operate, and the connection unit 31a, the communication unit 34a and the information storage unit 39a of the computer 15 operate.

Using a recipient phone number provided by the service provider 17 on the originating side, the service provider 18 on the receiving side 18 dials the connection unit 31a of the computer 15 (S41).

The communication unit 34a of the computer 15 reads out a user ID and a password registered in the information storage unit 39a. For example, the communication unit 34a reads out a user ID 'U02', and a password 'PSW02' (S42), and notifies the communication unit 52a of the service provider 18 accordingly (S43).

The communication unit 52a receiving the information from the communication unit 34a examines the user ID and the password registered in the information storage unit 55a (S44). When the user IDs match and the passwords match, the communication unit 52a permits an Internet connection. The communication unit 52a refuses a request from the call originator side when the user IDs and the passwords do not match. When the user ID and the password are authenticated by the service provider 18, the communication unit 52a notifies the communication unit 34a of the phone number and the IP address of the call originator. When the received information is different from the information registered in the information storage unit 39a, the communication unit 34a updates the registered information.

In this state, the computer 15 calls the telephone set 12 (S45) so that a user on the receiving side can start a conversation using the Internet by taking a receiver of the telephone set 12.

Figure 16:
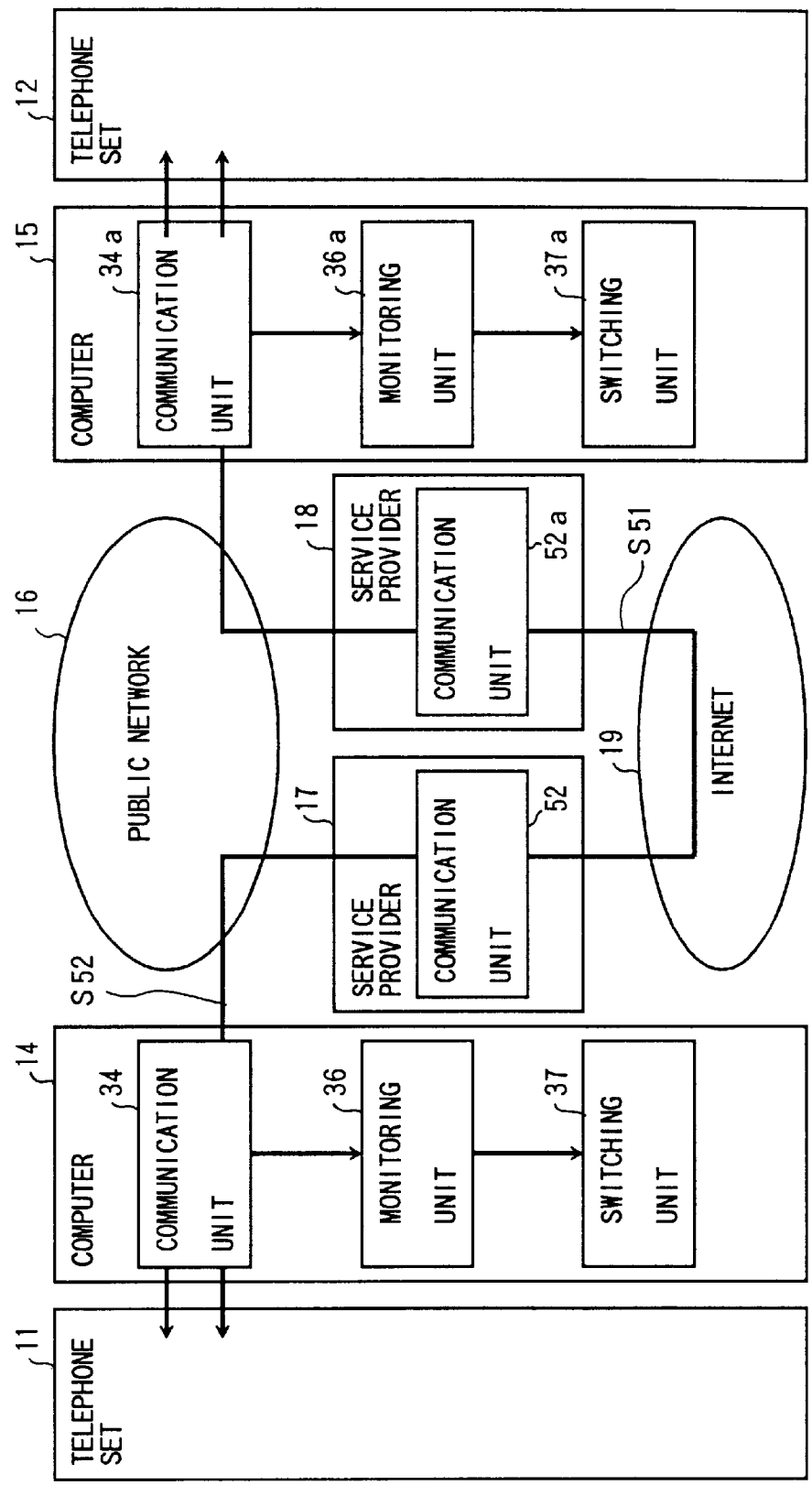
FIG. 16 shows an automatic switch between the Internet and a public network.

FIG. 16 shows an operation performed in the Internet telephone system shown in FIG. 5 for an automatic switch to a call using the ordinary public network 16 when it is not possible to guarantee a predetermined transmission rate in the call using the Internet 19. For example, in an automatic switch from the Internet 19 to the public network 16, the communication unit 34, the monitoring unit 36 and the switching unit 37 of the computer 14 on the originating side operate, and the communication unit 52 of the service provider 17 on the originating side 17 operates. Further, the communication unit 34a, the monitoring unit 36a and the switching unit 37a of the computer 15 on the receiving side operate. The communication unit 34a, the monitoring unit 36a and the switching unit 37a provide the same facilities as the equivalent units of the computer 14. In the service provider 18 on the receiving side, the communication unit 52a providing the same facilities as the communication unit 52 of the service provider 17 operates.

In a call using the Internet 19 between the telephone set 11 and the telephone set 12, the Internet telephone system according to the invention ensures that the call is made through the communication unit 34 of the computer 14, the communication unit 52 of the service provider 17, the communication unit 52a of the service provider 18, and the communication unit 34a of the computer 15 (S51).

When the predetermined transmission rate on the Internet 19 fails to be guaranteed, making it difficult to hear a sound in the call, the Internet telephone system according to the invention automatically switches from the Internet 19 to the public network 16, using the communication unit 34 and the communication unit 34a, so that the call can be continued (S52).

A switch between lines in the above step 52 is performed in the following procedures. The monitoring unit 36 monitors the transmission rate of data that the communication unit 34 processes in the communication. When a predetermined transmission rate fails to be guaranteed, the switching unit 37 sends control data instructing a switch from the Internet 19 to the public network 16 to the communication unit 34, so that the communication unit 34 switches the lines.

The switch between lines in step 52 is also performed in the computer 15. The monitoring unit 36a monitors the transmission rate of data processed by the communication unit 34a. When the predetermined transmission rate fails to be guaranteed, the switching unit 37a sends control data instructing a switch from the Internet 19 to the public network 16 to the communication unit 34a so that the communication unit 34a switches the line. In this way, switching between lines in the Internet telephone system according to the invention is started by the computer which has recognized that the transmission rate cannot be guaranteed.

Figure 17:
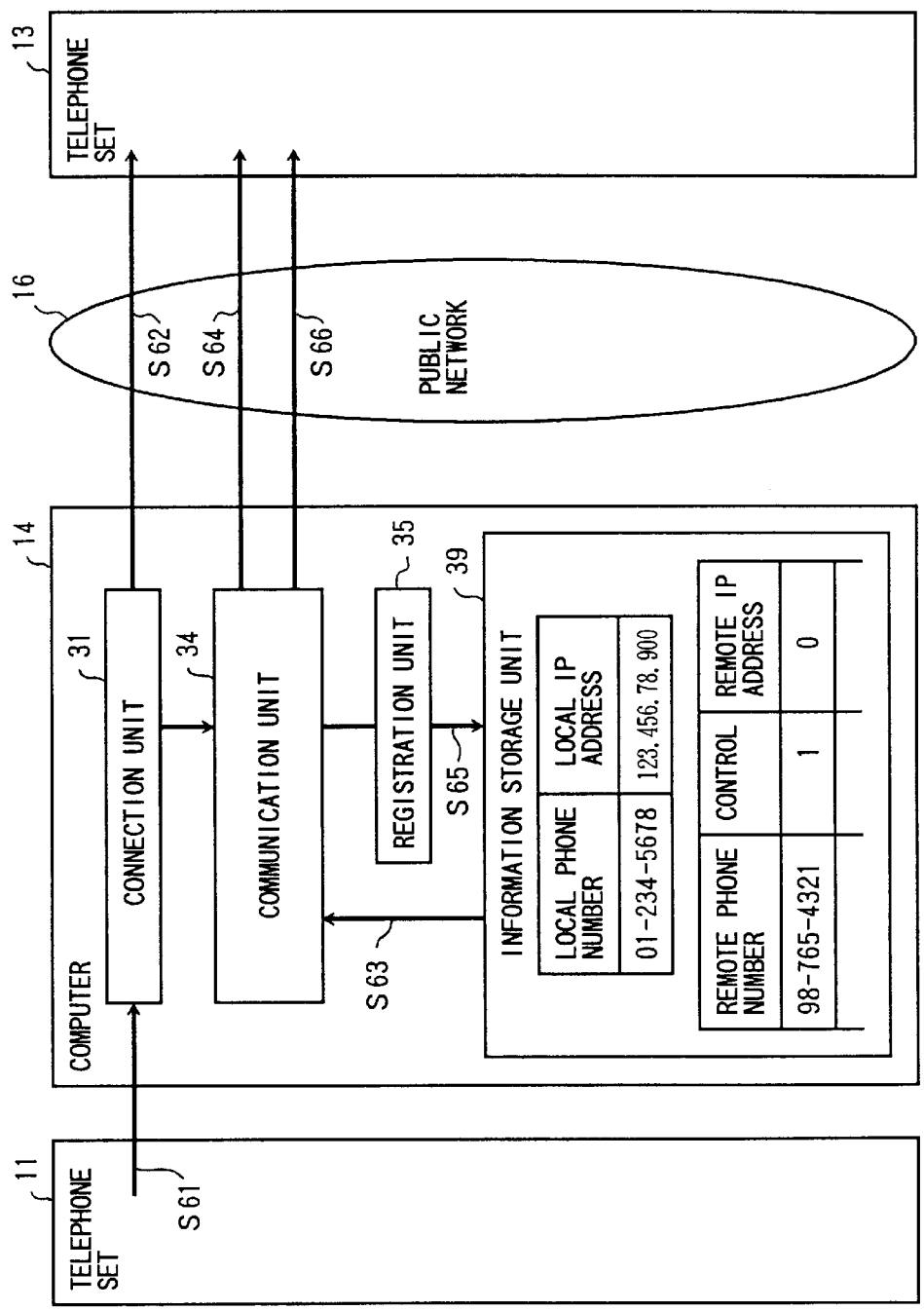
FIG. 17 shows an operation performed between the Internet telephone system and an existing telephone set.

FIG. 17 shows an operation performed in the Internet telephone system shown in FIG. 5 between the existing telephone set 13 not connected to a computer and the telephone set 11 connected to the computer 14. In an operation between the telephone set 11 connected to the computer 14 and the existing telephone set 13 not connected to a computer, the connection unit 31, the communication unit 34, the registering unit 35, and the information storage unit 39 of the computer 14 operate.

When the telephone set 13 is dialed by the telephone set 11 (S61), the connection unit 31 of the computer 14 dials the telephone set 13 using a phone number from the telephone set 11 (S62).

The communication unit 34 of the computer 14 examines the phone number information registered in the information storage unit 39 (S63). The communication unit 34 demands an IP address from the telephone set 13 in case the phone number information of the telephone set 13 does not exist in the destination phone number information, or when the control information of the destination phone number information is '1' (S64). When the control information of the destination phone number information is set to '1', it indicates that the call using the Internet is to be performed. When it is set to '0', it indicates that the call using the Internet is not to be performed.

Because the telephone set 13 cannot recognize the IP address request in the case shown in FIG. 17, the IP address is not provided. The registering unit 35 registers the phone number of the telephone set 13 as the destination phone number information, when it is found that the destination phone number information is not registered in the information storage unit 39 as a result of the examination by the communication unit 34 (S65).

Because the IP address request failed, the communication unit 34 recognizes the telephone set 13 as an ordinary telephone set not connected to a computer and supplies conversation data from the telephone set 11 to the telephone set 13 over the public network 16 as in any ordinary telephone call (S66).

Figure 18:
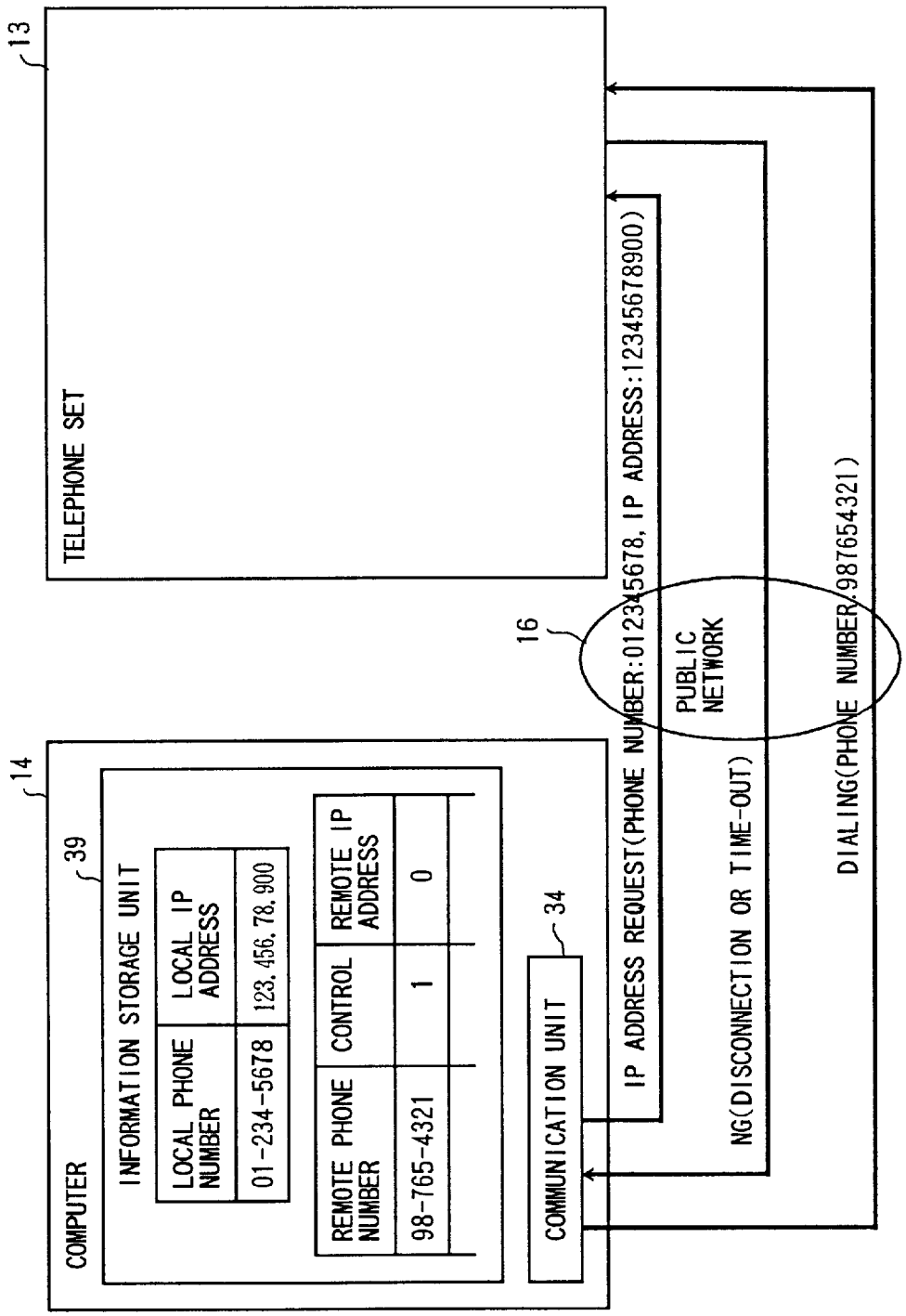
FIG. 18 shows control executed between the Internet telephone system and an existing telephone set.

FIG. 18 shows the control executed in the Internet telephone system shown in FIG. 5 between the existing telephone set 13 not connected to a computer and the telephone set 11 connected to the computer 14.

Because the computer 14 to which the telephone set 11 is connected cannot recognize whether a computer is connected to the destination telephone set 13, it refers to the destination phone number managed by the information storage unit 39.

When the destination phone number information is not registered or when the destination phone number information is registered and the control information is '1', the computer 14 assumes that the destination (the telephone set 13) is a computer and uses the public network 16 so as to demand an IP address from the telephone set 13, as shown in FIG. 18. Simultaneously, the computer 14 notifies the telephone set 13 of a phone number and an IP address of the telephone set 11.

However, the telephone set 13 cannot recognize the IP address request, the phone number and the IP address of the telephone set 11. The communication unit 34 recognizes such a state as an NG state wherein a disconnection of a line and a time-out have occurred. In this case, the communication unit 34 of the computer 14 dials the telephone set 13 for a second time so as to place a call via the public network 16.

Figure 19:
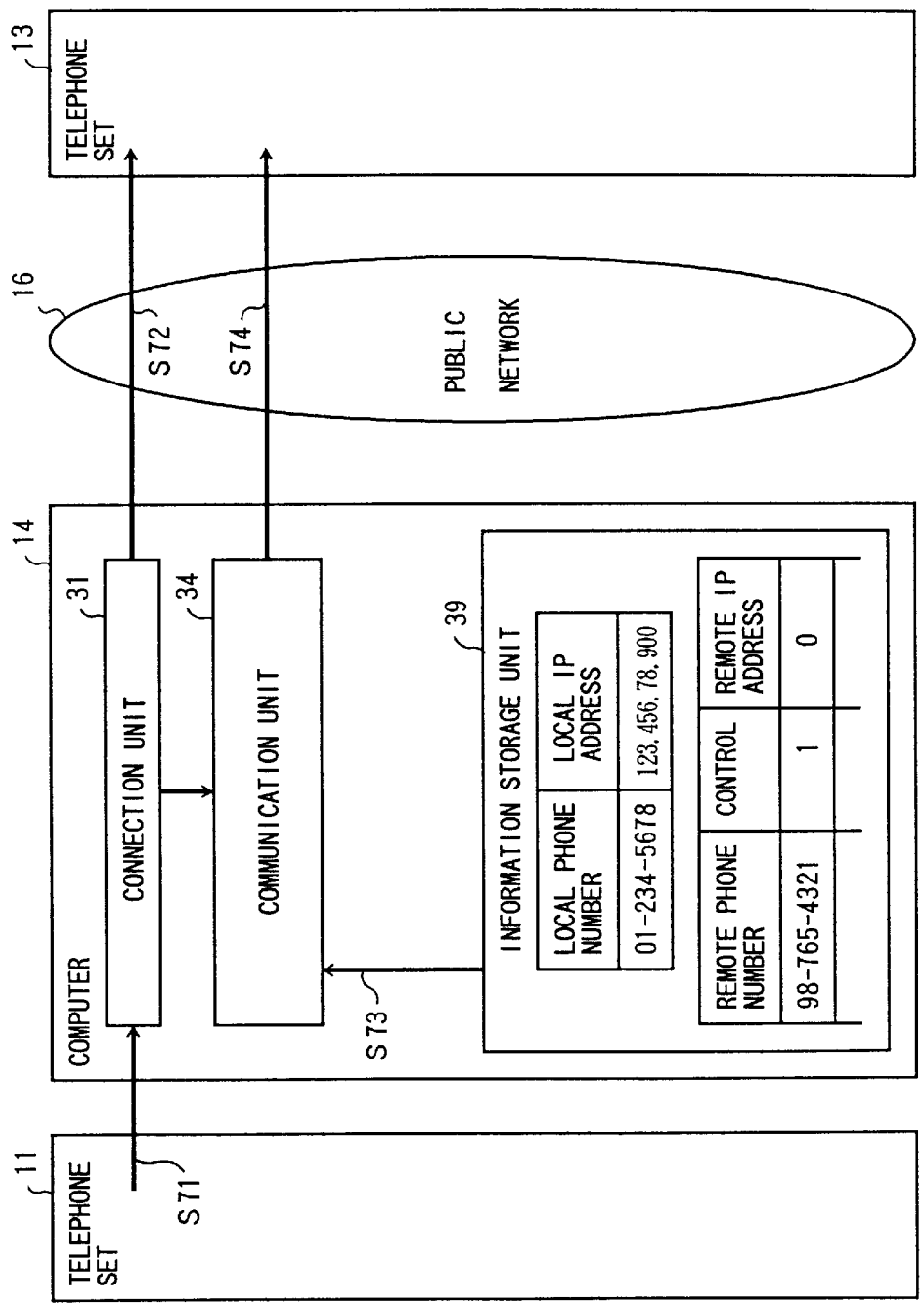
FIG. 19 shows an operation performed between the Internet telephone system and an existing telephone set.

FIG. 19 shows an operation performed in the Internet telephone system shown in FIG. 5 between the existing telephone set 13 not connected to a computer and the telephone set 11 connected to the computer 14, showing an operation different from the operation of FIG. 17. In an operation between the telephone set 11 connected to the computer 14 and the existing telephone set 13 not connected to a computer, the connection unit 31, the communication unit 34 and the information storage unit 39 of the computer 14 operate. The operation of FIG. 19 differs from the operation of FIG. 17 in that the control information provided in correspondence to the destination phone number registered in the information storage unit 39 is set to '0', indicating that the Internet is not used.

When the telephone set 11 dials the telephone set 13 (S71), the connection unit 31 of the computer 14 dials the telephone set 13, using a phone number provided by the telephone set 11 (S72).

The communication unit 34 of the computer 14 reads out the destination phone number information registered in the information storage unit 39 (S73). When the control information provided in correspondence to the destination phone number information is set to '0', the communication unit 34 supplies conversation data from the telephone set 11 to the telephone set 13 over the public network 16 as in an ordinary telephone call, without demanding an IP address from the telephone set 13 (S74).

Figure 20:
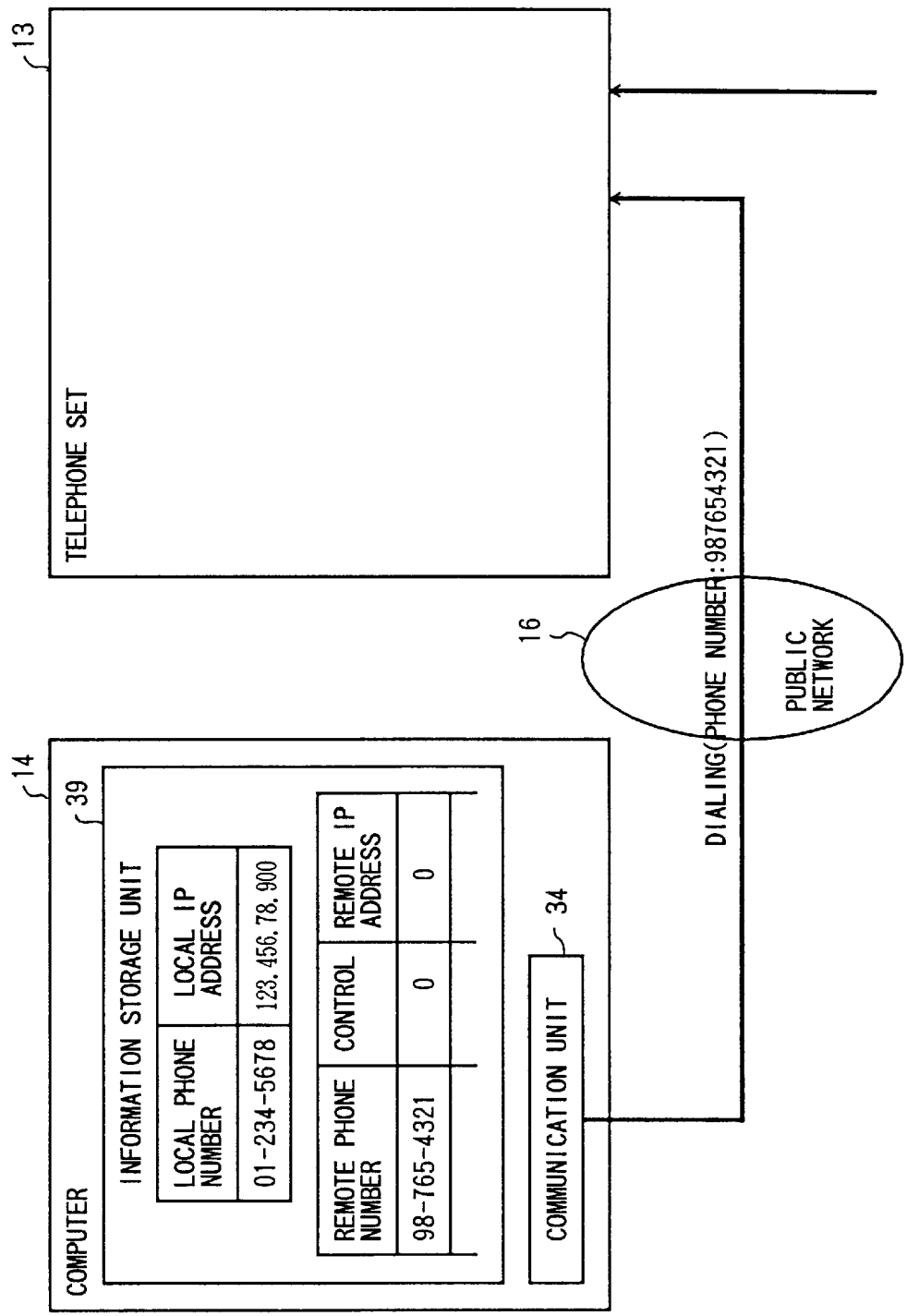
FIG. 20 shows control executed between the Internet telephone system and an existing telephone set.

FIG. 20 shows the control corresponding to FIG. 19 performed in the Internet telephone system shown in FIG. 5 between the existing telephone set 13 not connected to a computer and the telephone set 11 connected to the computer 14.

Because the computer 14 connected to the telephone set 11 cannot recognize whether a computer is connected to the destination telephone set 13, it examines the information storage unit 39.

When the destination phone number information is registered and the control information is set to '0', the computer 14 recognizes the destination (the telephone set 13) as being a telephone set not connected to a computer. The computer 14 uses the public network 16 to dial and performs a call over the public network 16.

Figure 21:
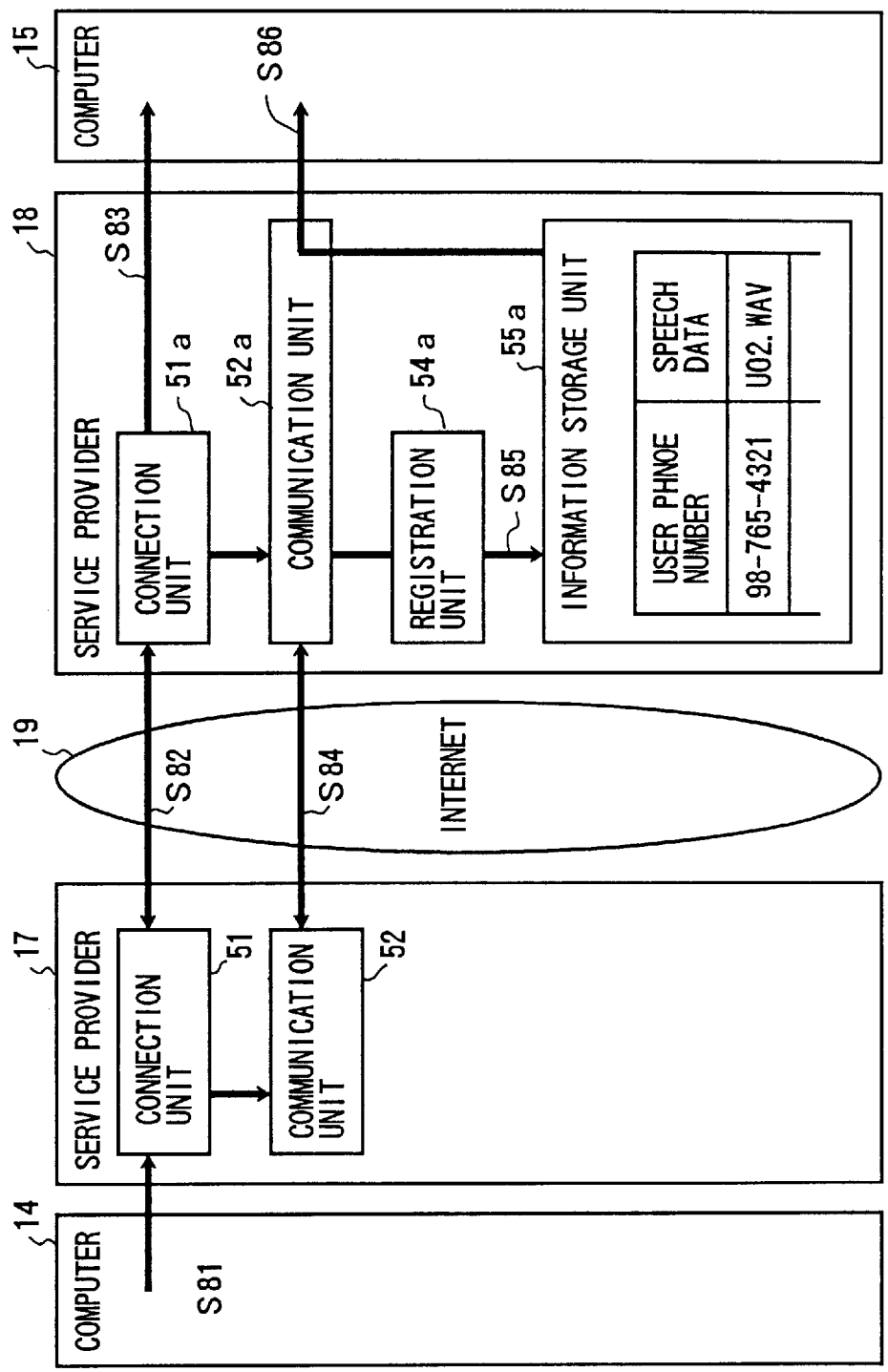
FIG. 21 shows an answer phone operation.

FIG. 21 shows an answer phone operation in the Internet telephone system shown in FIG. 5. For example, in the answer phone operation, the connection unit 51 and the communication unit 52 of the service provider 17 on the originating side operate, and the connection unit 51a, the communication unit 52a, the registering unit 54a and the information storage unit 55a of the service provider 18 on the receiving side operate. The connection unit 51a, the communication unit 52a, the registering unit 54a and the information storage unit 55a have the same facilities as the respective equivalent units of the service provider 17.

The computer 14 on the originating side dials the service provider 17 so as to perform a PPP connection (S81). Subsequently, an IP-IP connection is performed between the connection unit 51a of the service provider 18 and the connection unit 51 of the service provider 17 (S82).

The connection unit 51a of the service provider 18 tries connecting to the computer 15 on the receiving side (S83). When the connection fails for the reason that a power supply of the computer 15 is not on, for example, the registering unit 54a registers conversation data supplied from the communication unit 52 of the service provider 17 to the communication unit 52a of the service provider 18 (S84), in the information storage unit 55a (S85). The information storage unit 55a manages the registered data as conversation data for the associated user. The conversation data registered in the information storage unit 55a can be monitored by a request from the computer 15.

Figure 22:
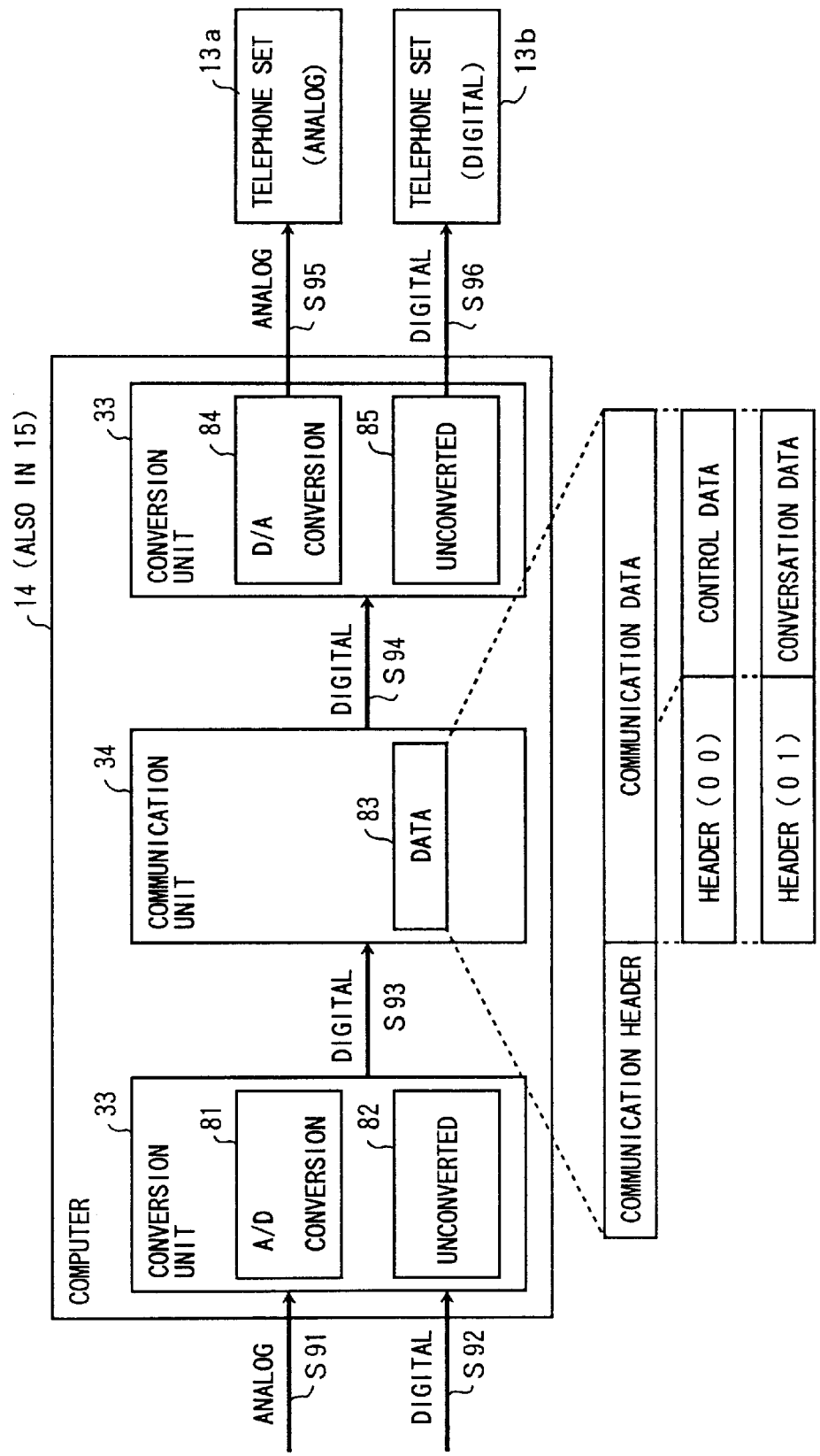
FIG. 22 shows analog/digital conversion.

FIG. 22 shows an operation of analog-to-digital conversion in the Internet telephone system shown in FIG. 5. In an operation of analog-to-digital conversion, the conversion unit 33 and the communication unit 34 of the computer 14 operate. The computer 15 in FIG. 5 provides similar facilities.

If the data on the line is analog data (S91), the conversion unit 33 of the computer 14 subjects the analog data to analog-to-digital conversion so as to convert the same into digital data (S93). If the data on the line is digital data (S92), the digital data are output through the conversion unit 33 (S93).

The communication unit 34 analyzes the digital data. The communication unit 34 is required to transmit the digital data to a call destination telephone set as conversation data, if the header is set to, for example, "1", as shown in FIG. 22. Accordingly, the communication unit 34 transmits the digital data to the conversion unit 33 (S94). If, for example, the header of the digital data is set to "00", as shown in FIG. 22, that is, if the digital data is control data specifying a request for switching between communication networks, an IP address request, an IP address notification or the like, the communication unit 34 executes the necessary control using the control data.

When a recipient telephone set is an analog telephone set 13a, the conversion unit 33 receiving the digital data (conversation data) in step 94 converts the conversation data into analog data, and supplies the analog data to the recipient telephone set (S95). When the recipient telephone set is a digital telephone set 13b, the conversion unit 33 receiving the digital data (conversation data) in step 94 supplies the digital data to the digital telephone 13b set without converting the conversation data into analog data (S96). Data from the analog telephone set 13a and the digital telephone set 13b is converted in a similar manner and transmitted to the destination telephone set.

Figure 23:
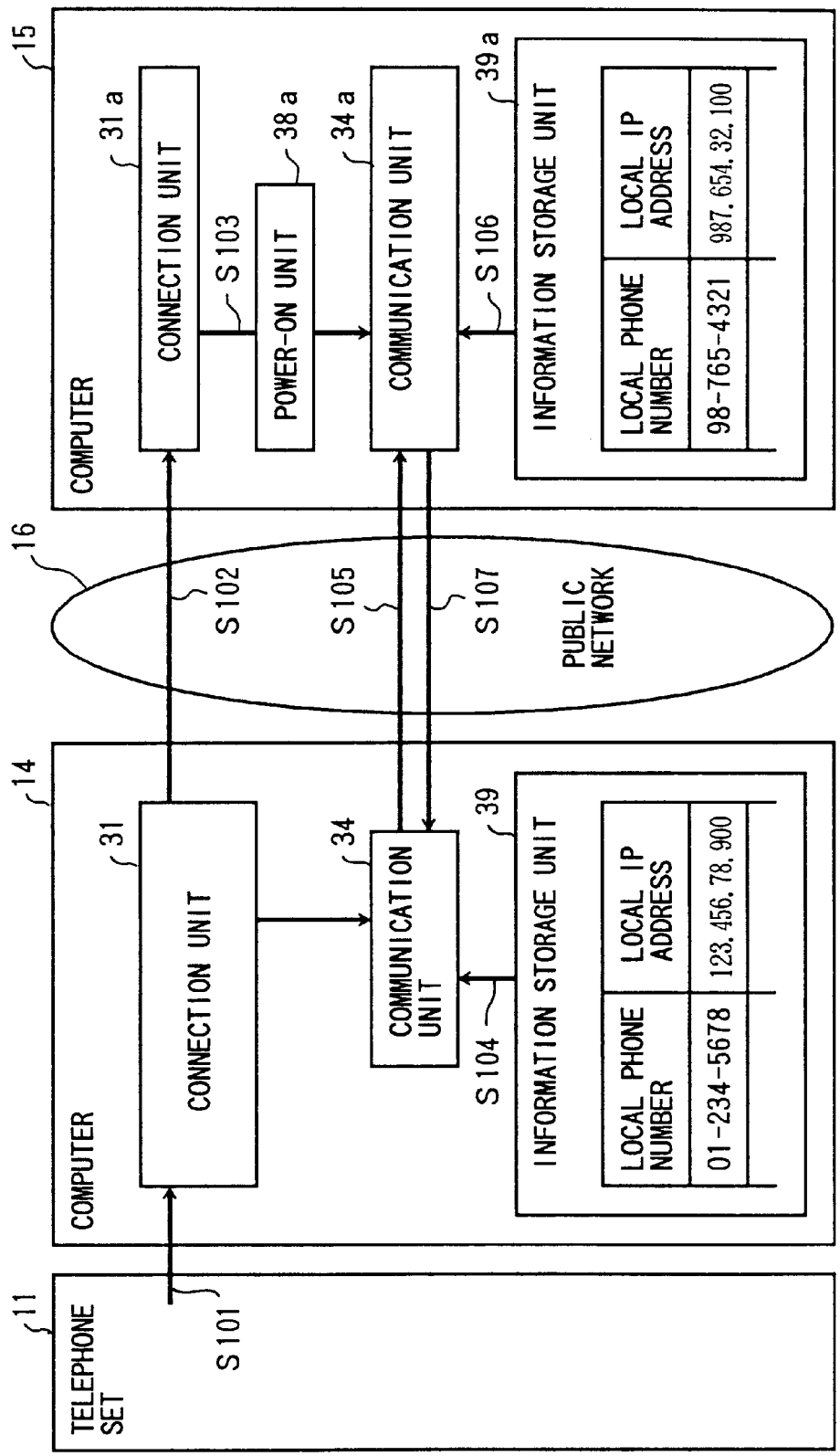
FIG. 23 shows an operation performed between computers.

FIG. 23 shows an operation for transmission and reception of information between the computer 14 and the computer 15 in the Internet telephone system shown in FIG. 5, performed when a main power supply of the destination computer 15 is on but the necessary hardware and software are not activated. In transmission and reception of information between the computer 14 and the computer 15, the connection unit 31, the communication unit 34 and the information storage unit 39 of the computer 14 operate, and the connection unit 31a, the communication unit 34a, the information storage unit 39a and the power-on unit 38a of the computer 15 operate. The communication unit 31a, the communication unit 34a, the information storage unit 39a and the power-on unit 38a provide the same facilities as the respective equivalent units of the computer 14. The computer 14 shown in FIG. 5 is also provided with the power-on unit 38 having similar facilities.

In transmission and reception of information between the computer 14 and the computer 15, if, for example, the telephone set 11 dials a telephone number when a power supply of the computer 15 is on but the necessary software and hardware are not activated (S101), the connection unit 31 of the computer 14 dials a phone number of the destination computer 15 so as to access the connection unit 31a over the public network 16 (S102). The connection unit 31a activates the power-on unit 38a (S103), and the power-on unit 38a executes a process to activate the necessary hardware and software.

In FIG. 23, the power-on unit 38a activates the communication unit 34a. The communication unit 34 of the computer 14 refers to the information managed by the information storage unit 39 (S104), and supplies an IP address request to the communication unit 34a of the computer 15 (S105).

The communication unit 34a supplied with the IP address request refers to the information managed by the information storage unit 39a (S106), and transmits an IP address notification to the communication unit 34 of the computer 14 (S107). When the operation of FIG. 23 is performed, it is required that each computer is capable of receiving information through a dialing process. When the dialing fails, the answer phone operation shown in FIG. 21 is executed.

Figure 24:
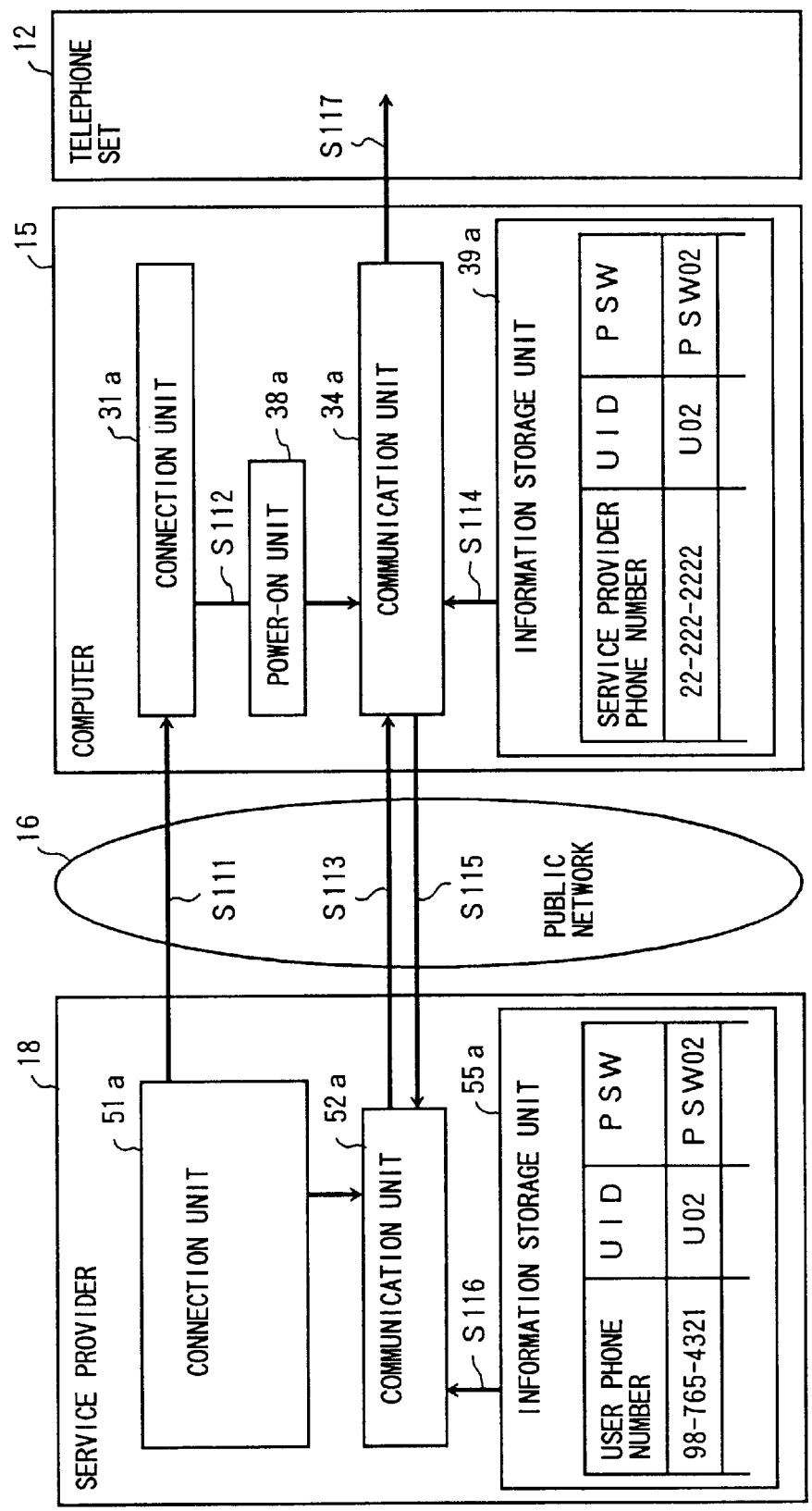
FIG. 24 shows an operation performed between a service provider on the receiving side and a computer.

FIG. 24 shows an operation for transmission and reception of information between the service provider 18 on the receiving side and the computer 15 on the receiving side, performed in the Internet telephone system shown in FIG. 5. FIG. 24 shows an operation example different from that of FIG. 15. In transmission and reception of information between the service provider 18 and the computer 15, the connection unit 51a, the communication unit 52a and the information storage unit 55a of the service provider 18 operate, and the connection unit 31a, the communication unit 34a, the information storage unit 39a and the power-on unit 38a of the computer 15 operate. The computer 14 shown in FIG. 5 is also provided with the power-on unit 38 having similar facilities.

Assuming that the computer 14 and the computer 15 are connected to each other over the Internet, a description will be given of transmission and reception of information performed when a power of the computer 15 is on but the necessary software and hardware are not activated, and when information relating to the recipient is already registered in the originating computer 14.

When an IP-IP connection between the service provider 17 on the originating side and the service provider 18 on the receiving side is completed in this state, the connection unit 51a of the service provider 18 uses the public network 16 to dial the computer 15 on the receiving side (S111).

The connection unit 31a of the computer 15 activates the power-on unit 38a (S112) and activates the necessary hardware and software. In FIG. 24, the communication unit 34a is activated.

In this state, the communication unit 52a demands a user ID and a password for authenticating a user from the communication unit 34a of the computer 15 (S113). The communication unit 34a receiving the notification refers to the information managed by the information storage unit 39a (S114), and supplies the communication unit 52a of the service provider 18 with the user ID and the password (S115).

The communication unit 52a receiving the information from the communication unit 34a examines the user ID and the password registered in the information storage unit 55a (S116). The communication unit 52a permits an Internet connection when the user IDs match and the passwords match. When the user IDs and the passwords do not match, the communication unit 52a refuses a request from the call originator side.

When the service provider 18 gives an authentication, the phone number and the IP address of the call originator are supplied from the communication unit 52a to the communication unit 34a. When it is found that the supplied information is different from the information that is registered in the information storage unit 39a, the communication unit 34a updates the registered information.

In this state, the computer 15 calls the telephone set 12 (S117), and a user on the receiving side starts a conversation using the Internet by operating the telephone set 12.

Figure 25:
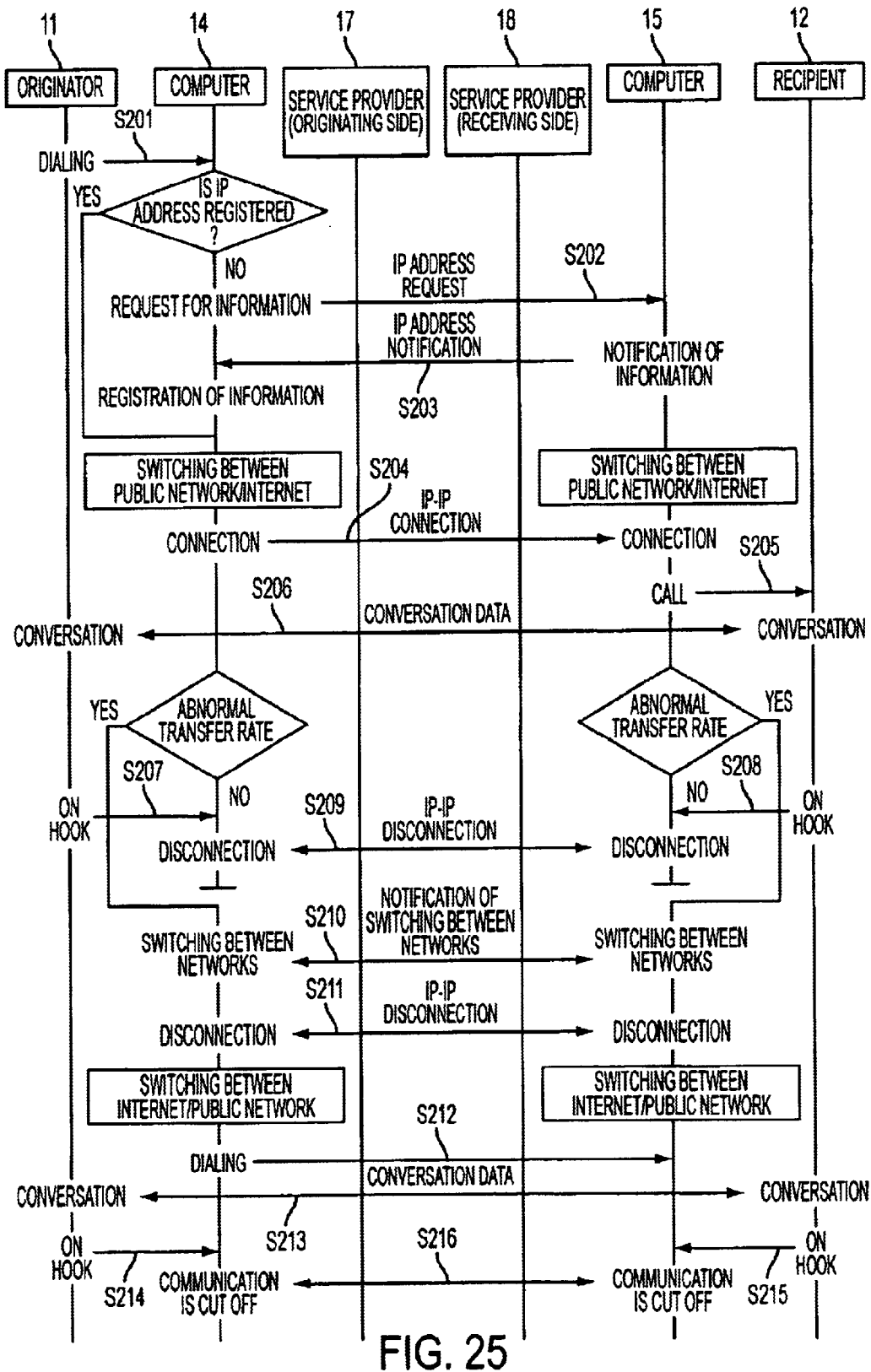
FIG. 25 is a flowchart of a process performed in an IP Internet telephone system.

FIG. 25 is a flowchart of an IP-type Internet telephone process executed in the Internet telephone system shown in FIG. 5, wherein the Internet 19 is used for IP-IP connection.

When the telephone set 11 on the originating side dials a phone number of the telephone set 12 on the receiving side (S201), the computer 14 on the originating side receiving the phone number searches the computer 14 for the phone number of the telephone set 12 on the receiving side.

When the phone number is not registered, the computer 14 uses the public network 16 to dial the phone number which the telephone set 11 on the originating side dialed and demands an IP address from the computer 15 on the receiving side (S202). Simultaneously, the computer 14 supplies a phone number and an IP address from the originating side. Upon receiving the IP address request, the computer 15 stores the phone number and the IP address from the originating side, and supplies the IP address thereof to the computer 14 on the originating side over the public network 16 (S203). The computer 14 on the originating side stores the received IP address and the phone number and disconnects itself from the public network 16 connected to the computer 15 on the receiving side. The computer 14 then enters an IP-IP connection with the IP address of the computer 15 on the receiving side over the Internet 19, via the service provider 17 and the service provider 18 (S204).

When it is determined in the dialing step 201 that the phone number of the telephone set 12 on the receiving side is registered in the computer 14, the computer 14 on the originating side establishes an IP-IP connection with the IP address of the computer 15 on the receiving side over the Internet 19 via the service provider 17 and the service provider 18 (S204).

When an IP-IP connection is completed, the computer 15 on the receiving side calls the telephone set 12 on the receiving side (S205) so that the telephone set 11 and the telephone set 12 can start a call (S206).

During a call, the computer 14 on the originating side and the computer 15 on the receiving side continue to monitor the transmission rate of conversation data on the Internet 19 to determine whether there is any abnormality in the transmission rate. The transmission rate of conversation data is preset by a user of the system. When the users of the telephone set 11 and the telephone set 12 execute an on-hook operation in this state (S207, S208), the IP-IP connection is terminated and a call is ended (S209).

For example, when an abnormality in the transmission rate is detected by the computer 14 on the originating side during a call, the computer 14 on the originating side transmits a network switching notification to the computer 15 on the receiving side (S210), so that the IP-IP connection between the computers on the Internet 19 is terminated (S211). When an abnormality in the transmission rate is detected by the computer 15 on the receiving side during a call, a similar operation is performed. That is, the computer 15 on the receiving side transmits a network switching notification to the computer 14 on the originating side (S210) so as to terminate the IP-IP connection between the computers on the Internet 19 (S211).

After the IP-IP connection is terminated, the computer 14 on the originating side dials the computer 15 on the receiving side over the public network 16 (S212) so as to establish a connection therewith over the public network 16 (S213). Thus, the users of the telephone set 11 and the telephone set 12 can talk with each other over the phone without being aware of the switch from the Internet 19 to the public network 16.

It is assumed that the users of the telephone set 11 and the telephone set 12 perform an on-hook operation in this state (S214, S215). If an IP-IP connection over the Internet 19 has been proceeding, the IP-IP connection is terminated (S216). If the connection is via the public network 16, the connection is terminated so that the call is ended.

Figure 26:
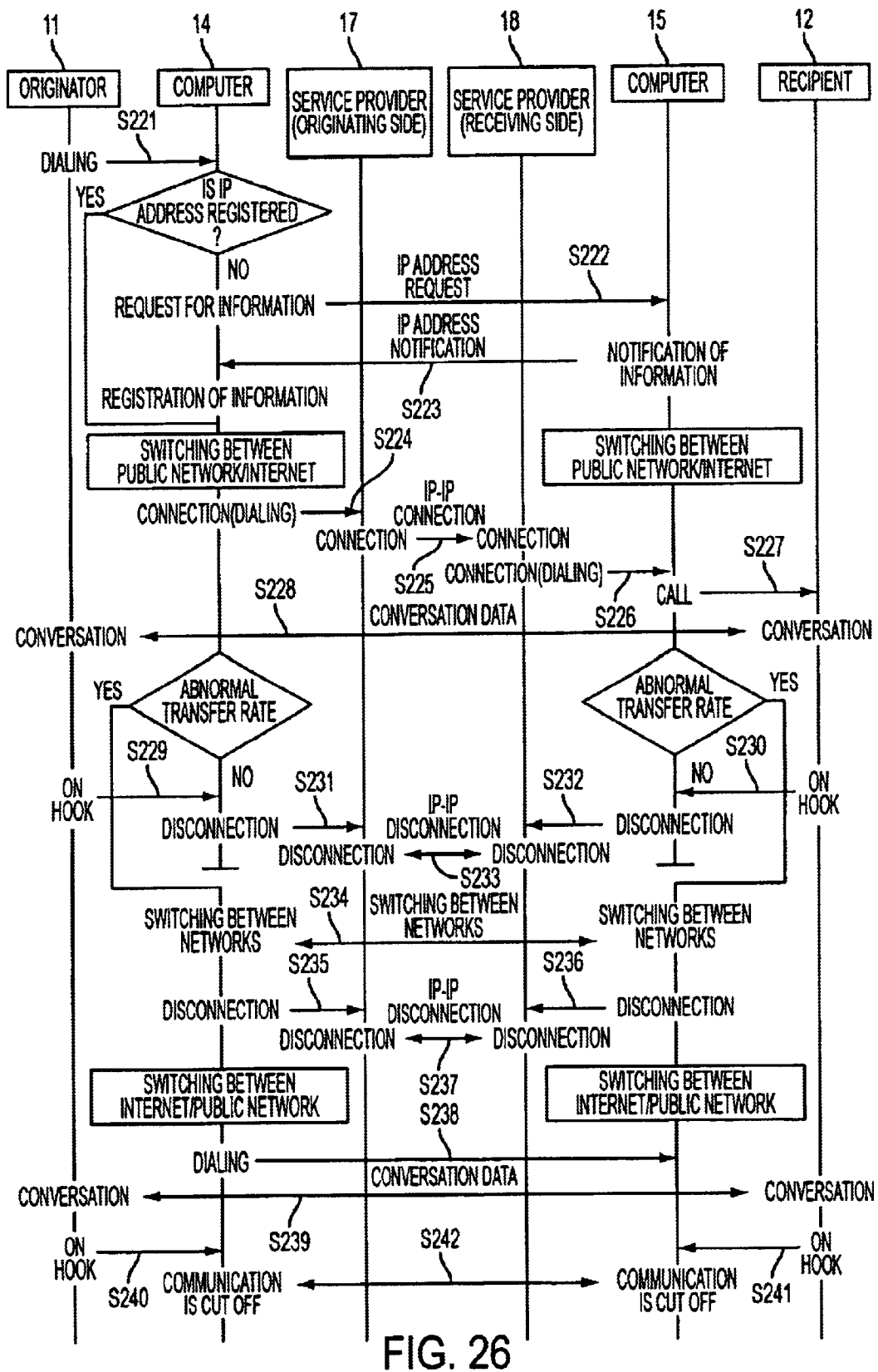
FIG. 26 is a flowchart of a process performed in a dial-up Internet telephone system.

FIG. 26 is a flowchart of a process of a dial-up Internet telephone system in which the Internet 19 is accessed by a dial-up connection.

When the telephone set 11 on the originating side dials a phone number of the telephone set 12 on the receiving side (S221), the computer on the originating side 14 receiving the phone number searches the computer 14 for the phone number of the telephone set 12 on the receiving side.

When the phone number is not registered, the computer 14 uses the public network 16 to dial the phone number which the telephone set 11 on the originating side dialed and demands an IP address from the computer 15 on the receiving side (S222). Simultaneously, the computer 14 supplies a phone number and an IP address from the originating side. Upon receiving the IP address request, the computer 15 stores the phone number and the IP address from the originating side, and supplies the IP address thereof to the computer 14 on the originating side over the public network 16 (S223). The computer 14 on the originating side stores the received IP address and the phone number and disconnects itself from the public network 16 connected to the computer 15 on the receiving side. The computer 14 dials the service provider 17, so as to establish a connection with the service provider 17 over the public network 16 (S224).

Simultaneously, the computer 14 on the originating side supplies the phone number and the IP address of the computer 15 on the receiving side to the service provider 17 on the originating side. Using the received IP address, the service provider 17 on the originating side establishes an IP-IP connection over the Internet 19 with the service provider 18 on the receiving side (S225). The service provider 17 on the originating side also supplies the received phone number to the service provider 18 on the receiving side. Using the received phone number, the service provider 18 on the receiving side dials the computer 15 on the receiving side (S226), so that the computer 15 on the receiving side calls the telephone set 12 when the connection with the service provider 18 is authenticated (S227). In this state, the telephone set 11 and the telephone set 12 can start a speech communication (S228).

When it is found that the phone number and the IP address of the telephone set 12 on the receiving side are registered in the computer 14 in the dialing step 221, the computer 14 on the originating side dials the service provider 17 so as to connect to the service provider 17 over the public network 16 (S224). Simultaneously, the computer 14 on the originating side notifies the service provider 17 on the originating side of the phone number and the IP address of the computer 15 on the receiving side. Using the received IP address, the service provider 17 on the originating side establishes an IP-IP connection over the Internet 19 with the service provider 18 on the receiving side (S225), and supplies the received phone number to the service provider 18 on the receiving side. Using the received phone number, the service provider 18 on the receiving side dials the computer 15 on the receiving side (S226). The computer 15 on the receiving side calls the telephone set 12 when the connection with the service provider 18 is authenticated (S227). The telephone set 11 and the telephone set 12 can start a speech communication in this state (S228).

During a call, the computer 14 on the originating side and the computer 15 on the receiving side continue to monitor the transmission rate of conversation data on the Internet 19 so as to determine whether there is any abnormality in the transmission rate. It is assumed that the transmission rate of conversation data is preset by a user of the system.

When the user of the telephone set 11 performs an on-hook operation in this state (S229), the computer 14 terminates the connection with the service provider 17 over the public network 16 (S231), and the service provider 17 terminates the IP-IP connection over the Internet 19 so that the call is ended (S233). Similarly, when the user of the telephone set 12 performs an on-hook operation (S230), the computer 15 terminates the connection between the computer 15 and the service provider 18 connected over the public network 16 (S232), and the service provider 18 terminates the IP-IP connection so that the call is ended (S233).

For example, when an abnormality in the transmission rate is detected by the computer 14 on the originating side during a call, the computer 14 on the originating side transmits a network switching notification to the computer 15 on the receiving side (S234), so that the connection between the computer 14 and the service provider 17 connected over the public network 16 is terminated (S235). Further, the service provider 17 terminates the IP-IP connection over the Internet 19 (S237). When an abnormality in the transmission rate is detected by the computer 15 on the receiving side during a call, a similar process is performed. That is, the computer 15 on the receiving side terminates the connection between the computer 15 and the service provider 18 connected over the public network 16 (S236). Further, the service provider 18 terminates the IP-IP connection over the Internet 19 (S237).

When the IP-IP connection is terminated, the computer 14 on the originating side dials the computer 15 on the receiving side over the public network 16 (S238) so as to establish a connection therewith over the public network 16 (S239). Thus, the users of the telephone set 11 and the telephone set 12 can talk to each other over the phone without being aware of the switch from the Internet 19 to the public network 16.

It is assumed that the users of the telephone set 11 and the telephone set 12 perform an on-hook operation in this state (S240, S241). If an IP-IP connection over the Internet 19 has been proceeding, the IP-IP connection is terminated (S242). If the connection is via the public network 16, the connection is terminated (S242) so that the call is ended.

Figure 27:
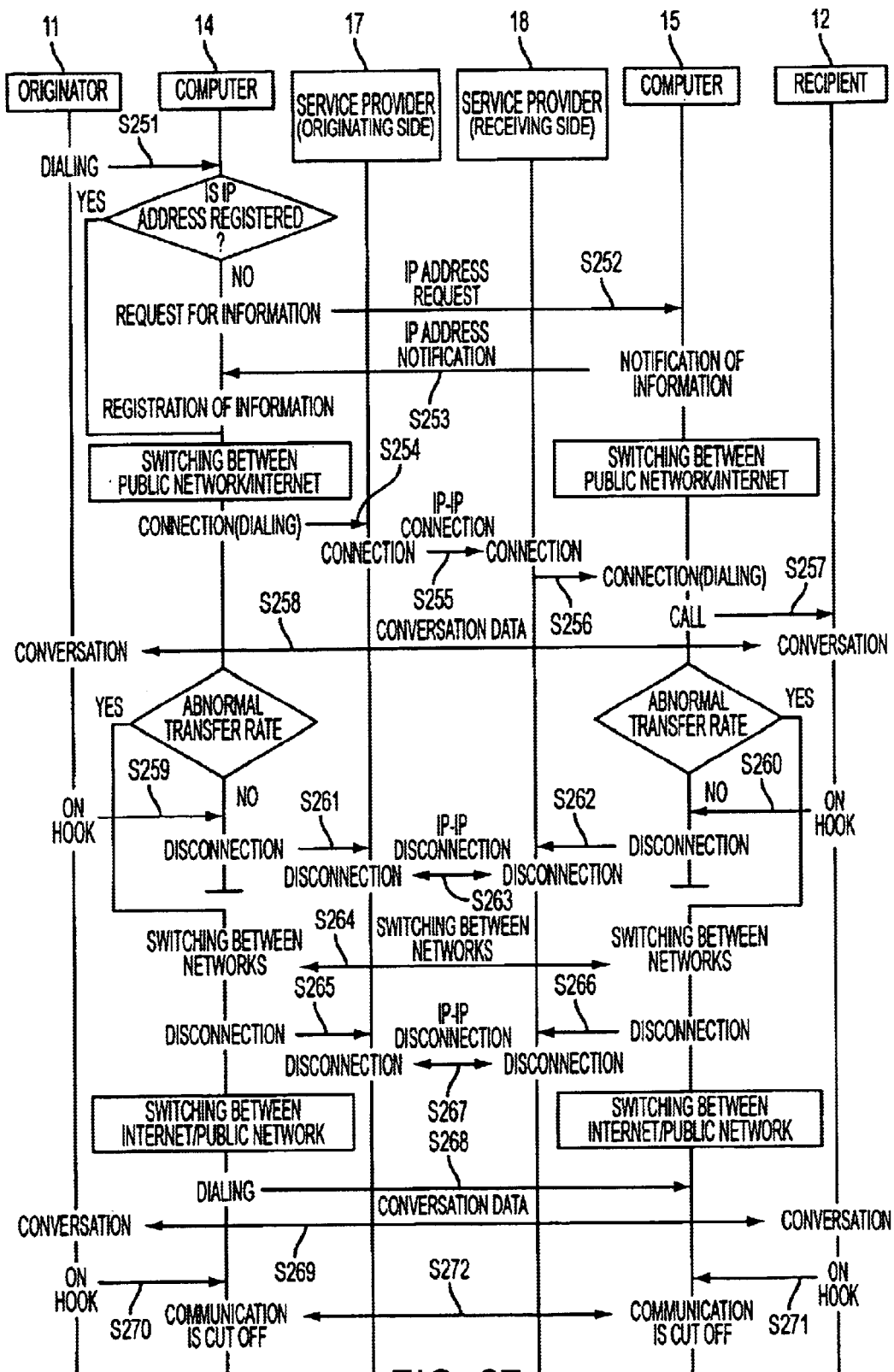
FIG. 27 is a flowchart of a process performed in a dial-up Internet telephone system.

FIG. 27 is a flowchart of a process of a dial-up Internet telephone system in which the Internet 19 is accessed by a dial-up connection, different from the process of FIG. 26.

When the telephone set 11 on the originating side dials a phone number of the telephone set 12 on the receiving side (S251), the computer on the originating side 14 receiving the phone number searches the computer 14 for the phone number of the telephone set 12 on the receiving side.

When the phone number is not registered, the computer 14 uses the public network 16 to dial the phone number which the telephone set 11 on the originating side dialed and demands an IP address from the computer 15 on the receiving side (S252). Simultaneously, the computer 14 supplies a phone number and an IP address from the originating side. Upon receiving the IP address request, the computer 15 stores the phone number and the IP address from the originating side, and supplies the IP address thereof to the computer 14 on the originating side over the public network 16 (S253). The computer 14 on the originating side stores the received IP address and the phone number and disconnects itself from the public network 16 connected to the computer 15 on the receiving side. The computer 14 dials the service provider 17, so as to establish a connection with the service provider 17 over the public network 16 (S254).

Simultaneously, the computer 14 on the originating side supplies the phone number and the IP address of the computer 15 on the receiving side to the service provider 17 on the originating side. Using the received IP address, the service provider 17 on the originating side establishes an IP-IP connection over the Internet 19 with the service provider 18 on the receiving side (S255). The computer 15 on the receiving side dials the service provider 18 on the receiving side (S256), so that the service provider 18 on the receiving side relates the information received earlier from the service provider 17 on the originating side to the information from the computer 15 on the receiving side. When the connection with the service provider 18 is authenticated, the computer 15 on the receiving side calls the telephone set 12 (S257). The telephone set 11 and the telephone set 12 can start a speech communication in this state (S258).

When it is found that the phone number and the IP address of the telephone set 12 on the receiving side are registered in the computer 14 in the dialing step 251, the computer 14 on the originating side dials the service provider 17 so as to connect to the service provider 17 over the public network 16 (S254). Simultaneously, the computer 14 on the originating side notifies the service provider 17 on the originating side of the phone number and the IP address of the computer 15 on the receiving side. Using the received IP address, the service provider 17 on the originating side establishes an IP-IP connection over the Internet 19 with the service provider 18 on the receiving side (S225), and supplies the received phone number to the service provider 18 on the receiving side. The computer 15 on the receiving side dials the service provider 18 on the receiving side (S256), and the service provider 18 on the receiving side relates the information received earlier from the service provider 17 on the originating side to the information from the computer 15 on the receiving side. When the connection with the service provider 18 is authenticated, the computer 15 on the receiving side calls the telephone set 12 (S257). The telephone set 11 and the telephone set 12 can start a speech communication in this state (S258).

During a call, the computer 14 on the originating side and the computer 15 on the receiving side continue to monitor the transmission rate of conversation data on the Internet 19 so as to determine whether there is any abnormality in the transmission rate. It is assumed that the transmission rate of conversation data is preset by a user of the system.

When the user of the telephone set 11 performs an on-hook operation in this state (S259), the computer 14 terminates the connection with the service provider 17 over the public network 16 (S261), and the service provider 17 terminates the IP-IP connection over the Internet 19 so that the call is ended (S263). Similarly, when the user of the telephone set 12 performs an on-hook operation (S260), the computer 15 terminates the connection between the computer 15 and the service provider 18 connected over the public network 16 (S262), and the service provider 18 terminates the IP-IP connection so that the call is ended (S263).

For example, when an abnormality in the transmission rate is detected by the computer 14 on the originating side during a call, the computer 14 on the originating side transmits a network switching notification to the computer 15 on the receiving side (S264), so that the connection between the computer 14 and the service provider 17 connected over the public network 16 is terminated (S265). Further, the service provider 17 terminates the IP-IP connection over the Internet 19 (S267). When an abnormality in the transmission rate is detected by the computer 15 on the receiving side during a call, a similar process is performed. That is, the computer 15 on the receiving side terminates the connection between the computer 15 and the service provider 18 connected over the public network 16 (S266). Further, the service provider 18 terminates the IP-IP connection over the Internet 19 (S267).

When the IP-IP connection is terminated, the computer 14 on the originating side dials the computer 15 on the receiving side over the public network 16 (S268) so as to establish a connection therewith over the public network 16 (S269). Thus, the users of the telephone set 11 and the telephone set 12 can talk to each other over the phone without being aware of the switch from the Internet 19 to the public network 16.

It is assumed that the users of the telephone set 11 and the telephone set 12 perform an on-hook operation in this state (S270, S271). If an IP-IP connection over the Internet 19 has been proceeding, the IP-IP connection is terminated (S272). If the connection is via the public network 16, the connection is terminated (S272) so that the call is ended.

Figure 28:
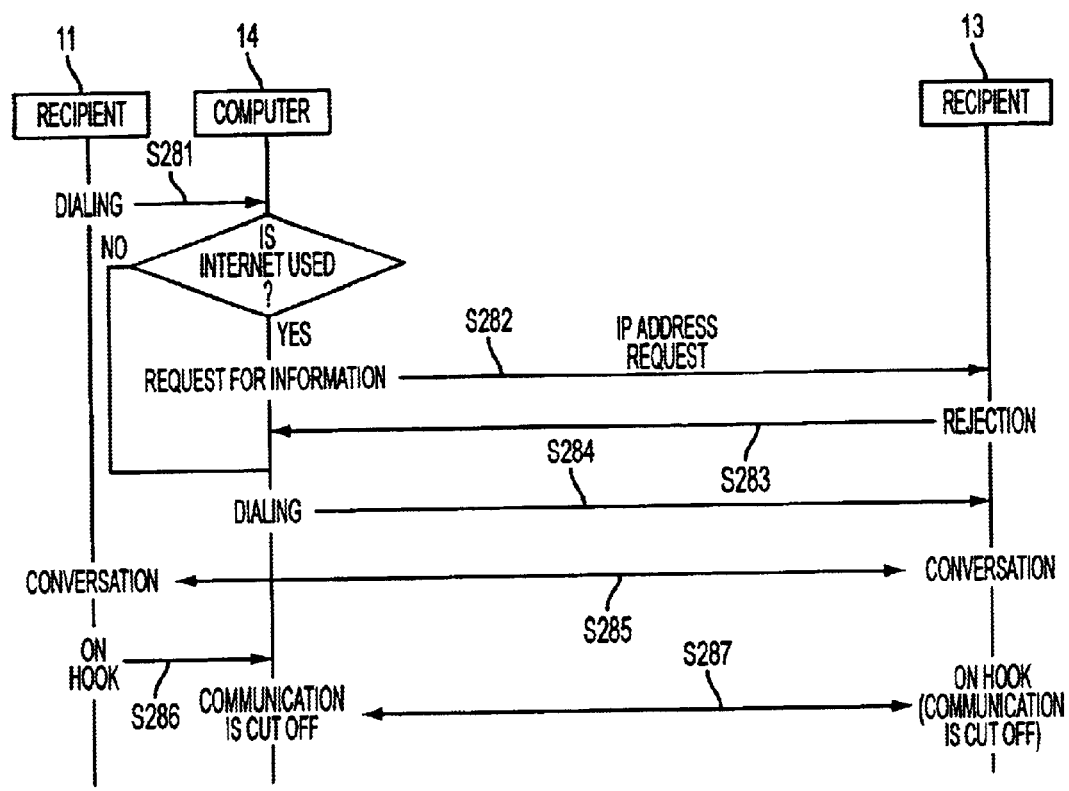
FIG. 28 is a flowchart of a process performed between a dial-up Internet telephone system and an existing telephone set.

FIG. 28 is a flowchart of a process performed between the existing telephone set and a dial-up Internet telephone system in which the Internet 19 is accessed by a dial-up connection.

When the telephone set 11 on the originating side dials a phone number of the telephone set 13 on the receiving side (S281), the computer 14 on the originating side searches the computer 14 for the phone number of the telephone set 13 on the receiving side.

When the phone number is not registered, or when the phone number is registered and information indicating that the Internet is to be used is provided in relation to the registered phone number, the computer 14 on the originating side dials the previously received phone number over the public network 16 to access the telephone set 13 on the receiving side, and requests an IP address from the telephone set 13 (S282). Simultaneously, the computer 14 supplies the phone number and the IP address from the originating side. Because the telephone set 13 receiving the IP address request cannot recognize the request, it rejects the request by not returning a response, for example (S283).

If the phone number is registered, and information indicating that the Internet is not to be used is provided in relation to the registered phone number, the computer 14 on the originating side recognizes that the telephone set 13 on the receiving side is an ordinary telephone set to which a computer is not connected to, whereupon the computer 14 performs a dialing process over the public network 16 (S284).

In this state, the telephone set 11 and the telephone set 13 can start an ordinary telephone call over the public network 16 (S285). When the user of the telephone set 11 on the originating side and the user of the telephone set 13 on the receiving side perform an on-hook operation during a call (S286), the connection over the public network 16 is terminated (S287).

Figure 29:
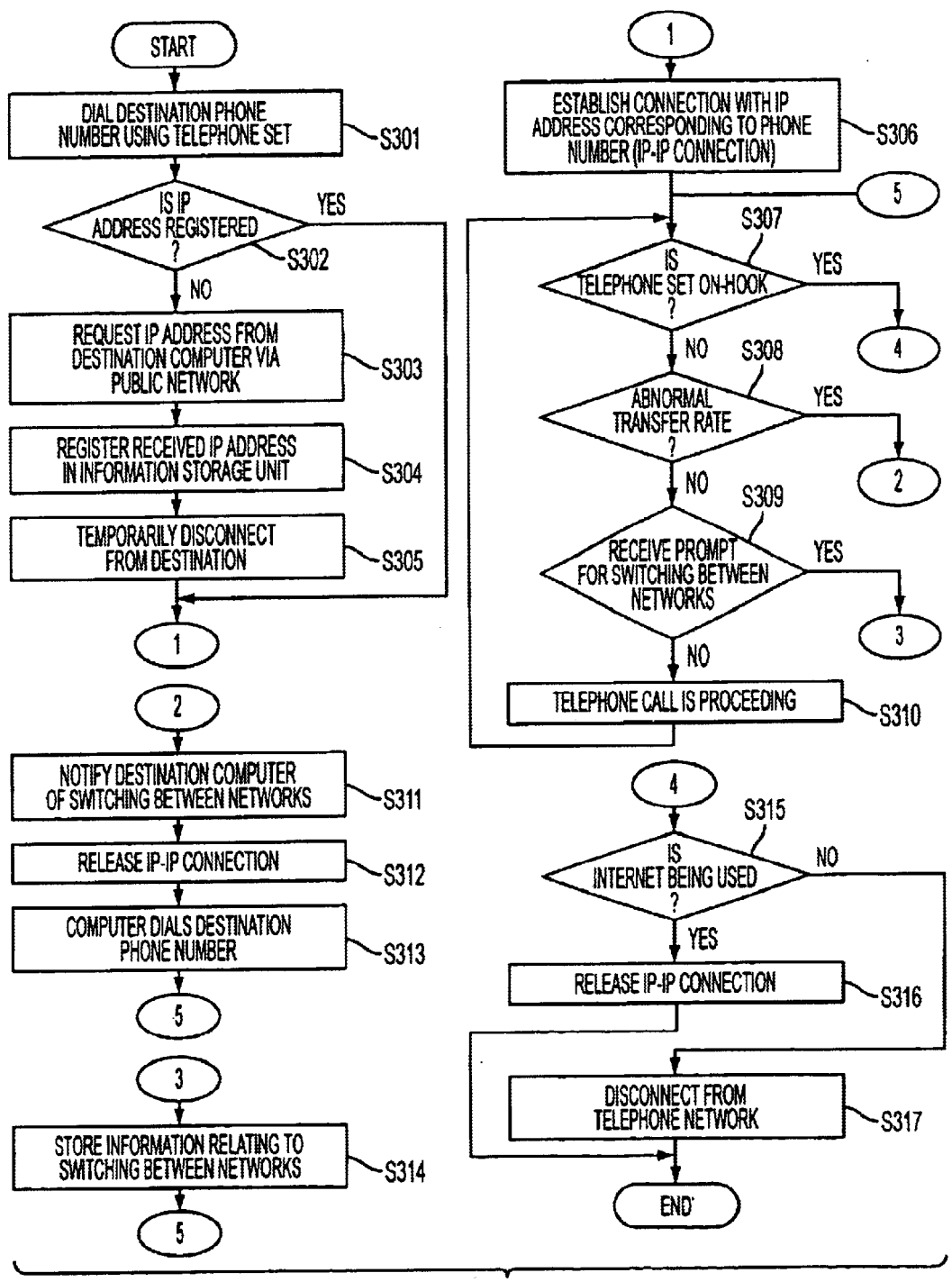
FIG. 29 is a flowchart of a process performed on the originating side of an IP Internet telephone system.

FIG. 29 shows a flowchart of a process performed on the originating side of the dial-up IP Internet telephone system in which the Internet 19 is accessed by a dial-up connection.

When the telephone set 11 on the originating side dials a phone number of the telephone set 12 on the receiving side (S301), the computer 14 on the originating side receiving the phone number searches the computer 14 to determine whether the recipient phone number and the recipient IP address are registered in the computer 14 (S302).

When the phone number and the IP address are not registered (S302, NO), the computer 14 on the originating side uses the public network 16 to dial the phone number which the telephone set 11 on the originating side dialed, and demands an IP address from the computer 15 on the receiving side (S303). Simultaneously, the computer 14 supplies the phone number and the IP address from the originating side.

When the IP address and the phone number from the computer 15 are supplied to the computer 14 on the originating side over the public network 16 as a reply to the IP address request, the computer 14 on the originating side stores the received IP address and phone number (S304), and disconnects itself from the public network 16 connected to the computer 15 on the receiving side (S305). Further, the computer 14 establishes an IP-IP connection with the IP address of the computer 15 on the receiving side over the Internet 19, via the service provider 17 and the service provider 18 (S306).

When it is determined in the search step 302 that the phone number and the IP address of the telephone set 12 on the receiving side are registered in the computer 14 (S302, YES), the computer 14 on the originating side establishes an IP-IP connection over the Internet 19 with the IP address of the computer 15 on the receiving side, via the service provider 17 and the service provider 18 (S306).

When the IP-IP connection is completed, the computer 15 on the receiving side calls the telephone set 12 on the receiving side. In this state, the telephone set 11 and the telephone set 12 can start a telephone call.

It is assumed that a user of the telephone set 11 performs an on-hook operation while a call is proceeding (S307, YES). When a call using the Internet 19 is proceeding (S315, YES), the computer 14 on the originating side terminates the IP-IP connection (S316) so as to end the call. When a call using the public network 16 is proceeding (S315, NO), the computer 14 on the originating side terminates the connection with the public network 16 (S317) so as to end the call.

The computer 14 on the originating side continues to monitor the transmission rate of conversation data on the Internet 19 to determine whether there is any abnormality in the transmission rate (S308). It is assumed that the transmission rate of conversation data is preset by the user of the system.

For example, when the computer 14 on the originating side has detected an abnormality in the transmission rate during a call (S307, NO) (S308, YES), the telephone set 14 on the originating side transmits a network switch notification to the computer 15 on the receiving side (S311) and terminates the IP-IP connection between the computers on the Internet 19 (S312).

After terminating the IP-IP connection, the computer 14 on the originating side dials the computer 15 on the receiving side over the public network 16 in (S313) so as to establish a connection therewith over the public network 16. Thus, the user of the telephone set 11 can make a telephone call without being aware of the switch from the Internet 19 to the public network 16.

For example, when the computer 15 on the receiving side detects an abnormality in the transmission rate during a call, and the computer 14 receives a network switch notification from the computer 15 (S307, NO) (S308, NO) (S309, YES) (S314), the telephone set 14 on the originating side stores the information relating to the network switching.

When the user of the telephone set 11 does not perform an on-hook operation during a call (S307, NO), when the computer 14 on the originating side does not detect an abnormality in the transmission rate during the call (S308, NO) and when the network switch notification from the computer 15 is not received during the call (S309, NO), the computer 14 on the originating side maintains the call state (S310).

Figure 30:
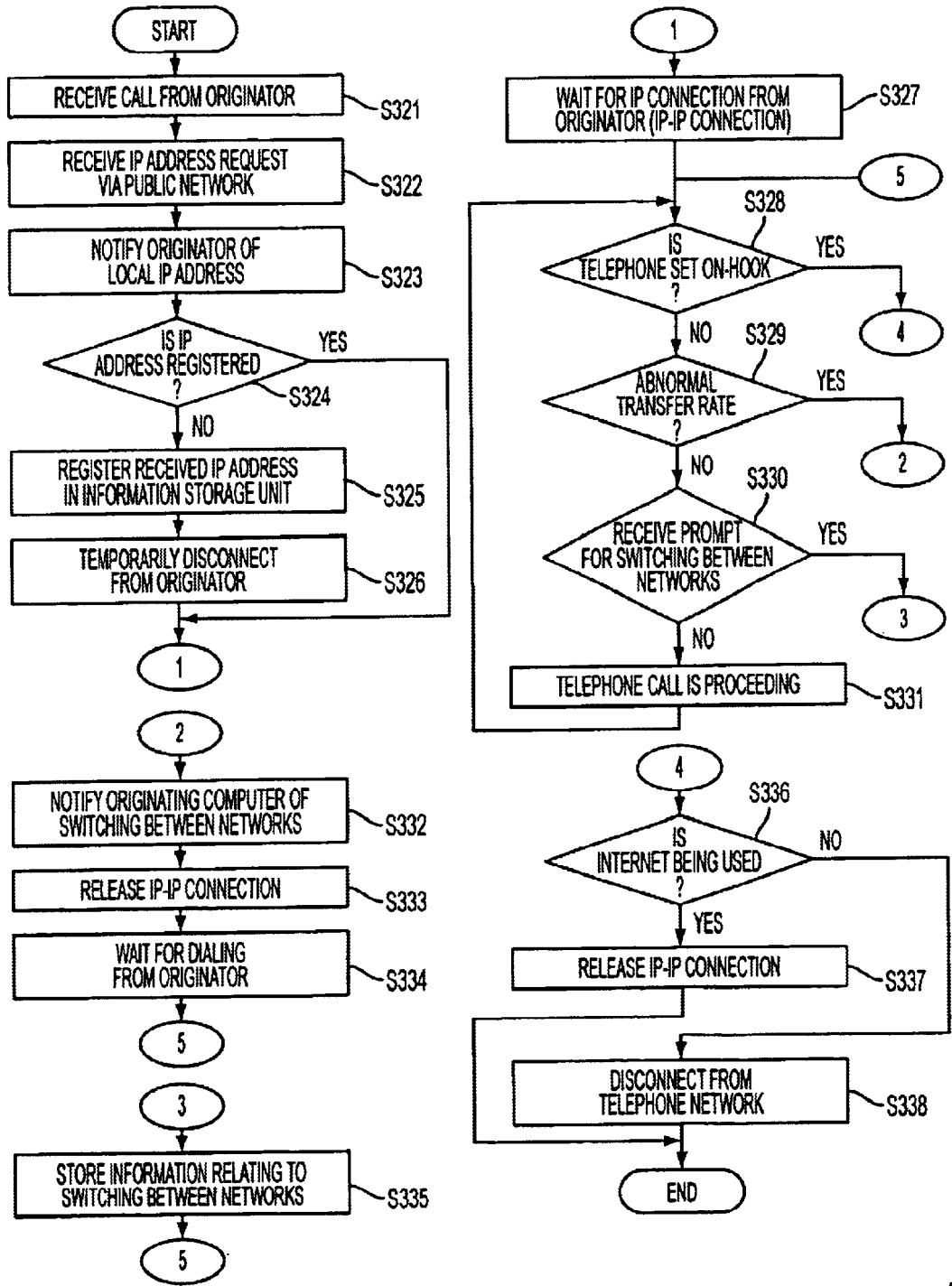
FIG. 30 is a flowchart of a process performed on the receiving side of an IP Internet telephone system.

FIG. 30 is a flowchart of a process performed on the receiving side of an IP Internet telephone system in which the Internet 19 is accessed by an IP-IP connection.

When the computer 15 on the receiving side receives a dialing signal from the telephone set 11 on the originating side (S321), the computer 15 on the receiving side receives an IP address request, a phone number and an IP address from the originating side (S322). The computer 15 on the receiving side receiving the IP address request supplies a phone number and an IP address on the receiving side to the computer 14 on the originating side as a reply (S323).

The computer 15 on the receiving side receiving the phone number and the IP address from the originating side searches itself to determine whether the received information is registered in the computer 15 (S324).

When the phone number and the IP address are not registered (S324, NO), the computer 15 on the receiving side registers the phone number and the IP address from the originating side (S325). The computer 15 then terminates the connection with the public network 16 connected to the computer 14 on the originating side (S326) and waits for an IP-IP connection over the Internet 19 with the computer 14 on the originating side (S327).

When it is determined in step 324 that the phone number and the IP address from the originating side are registered in the computer 15 (S324, YES), the computer 15 on the receiving side waits for an IP-IP connection over the Internet 19 with the computer 14 on the originating side (S327).

When the IP-IP connection is completed, the computer 15 on the receiving side calls the telephone set 12 on the receiving side. In this state, the telephone set 11 and the telephone set 12 can start a call.

It is assumed that the user of the telephone set 12 performs an on-hook operation during a call (S328, YES). When a call using the Internet 19 is proceeding (S336, YES), the computer 15 on the receiving side terminates the IP-IP connection (S337) so as to end the call. When a call using the public network 16 is proceeding (S336, No), the computer 15 on the receiving side terminates the connection with the public network 16 (S338) so as to end the call.

The computer 15 on the receiving side continues to monitor the transmission rate of conversation data on the Internet 19 so as to determine whether there is any abnormality in the transmission rate (S329). It is assumed that the transmission rate of conversation data is preset by the user of the system.

For example, when the computer 14 on the originating side has detected an abnormality in the transmission rate during a call (S328, NO) (S329, YES), the telephone set 15 on the receiving side transmits a network switch notification to the computer 14 on the originating side (S332) and terminates the IP-IP connection between the computers on the Internet 19 (S333).

After terminating the IP-IP connection, the computer 15 on the receiving side waits for a dialing signal from the computer 14 on the originating side (S334), and when the dialing signal arrives from the computer 14 on the originating side, the computer 15 establishes a connection therewith over the public network 16. Thus, the user of the telephone set 12 can receive a telephone call without being aware of the switch from the Internet 19 to the public network 16.

For example, when the computer 14 on the originating side detects an abnormality in the transmission rate during a call, and when the computer 15 receives the network switch notification from the computer 14 (S328, NO) (S329, NO) (S330, YES), the telephone set 15 on the receiving side stores information relating to network switching (S335).

When the user of the telephone set 12 does not perform an on-hook operation during a call (S328, NO), when the computer 15 on the receiving side does not detect an abnormality in the transmission rate during the call (S329, NO), and when the network switch notification from the computer 14 is not received during the call (S330, NO), the computer 15 on the receiving side maintains the call state (S331).

Figure 31:
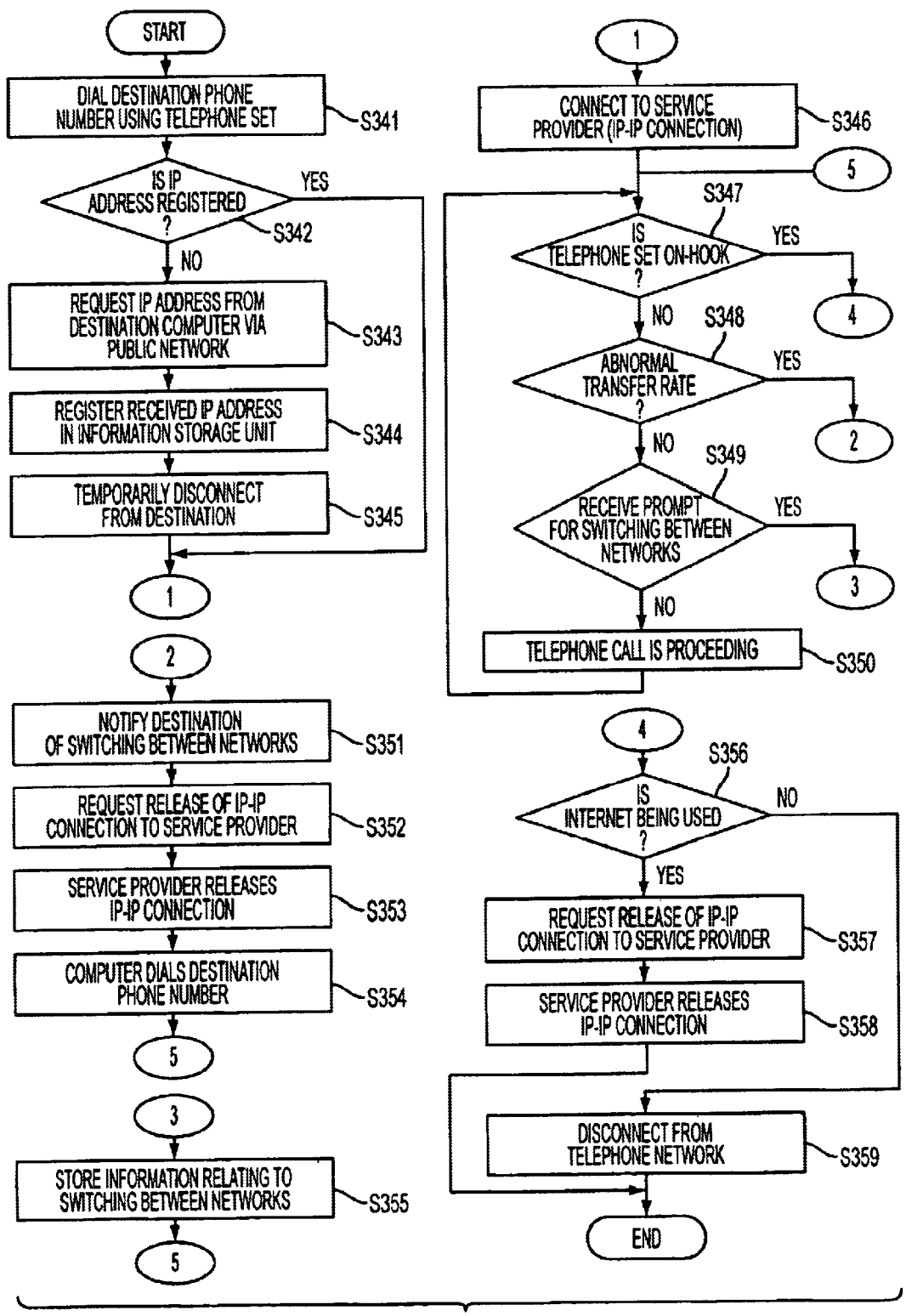
FIG. 31 is a flowchart of a process performed on the originating side of a dial-up Internet telephone system.

FIG. 31 is a flowchart of a process performed on the originating side of a dial-up Internet telephone system in which the Internet 19 is accessed by a dial-up connection.

When the telephone set 11 on the originating side dials a phone number of the telephone set 12 on the receiving side (S341), the computer 14 on the originating side receiving the phone number searches itself to determined whether the received phone number and IP address are registered in the computer 14 (S342).

When the phone number and the IP address are not registered (S342, NO), the computer 14 on the originating side uses the public network 16 to dial the phone number that the telephone set 11 on the originating side dialed and requests an IP address from the computer 15 on the receiving side (S343). Simultaneously, the computer 14 supplies a phone number and an IP address from the originating side.

When the IP address and the phone number from the computer 15 are supplied to the computer 14 on the originating side over the public network 16 in reply to the IP address request, the computer 14 on the originating side stores the received IP address and phone number (S344). The computer 14 then terminates the connection with the public network 16 connected to the computer 15 on the receiving side (S345) and dials the service provider 17 so as to connect to the service provider 17 over the public network 16 (S346). Simultaneously, the computer 14 on the originating side supplies a phone number and an IP address of the computer 15 on the receiving side to the service provider 17 on the transmitting side.

The service provider 17 on the originating side establishes an IP-IP connection to the service provider 18 on the receiving side over the Internet 19, using the received IP address, and supplies the received phone number to the service provider 18 on the receiving side. The service provider 18 on the receiving side dials the computer 15 on the receiving side using the received phone number so that the computer 15 on the receiving side calls the telephone set 12 when the connection with the service provider 18 is authenticated.

When it is determined in step 342 that the phone number and the IP address of the telephone set 12 on the receiving side are registered in the computer 14 (S342, YES), the computer 14 on the originating side dials the service provider 17 so as to connect to the service provider 17 over the public network 16 (S346). Simultaneously, the computer 14 on the originating side supplies a phone number and an IP address of the computer 15 on the receiving side to the service provider 17 on the originating side.

The service provider 17 on the originating side establishes an IP-IP connection to the service provider 18 on the receiving side over the Internet 19 using the received IP address, and supplies the received phone number to the service provider 18 on the receiving side. The service provider 18 on the receiving side dials the computer 15 on the receiving side using the received phone number so that the computer 15 on the receiving side calls the telephone set 12 when the connection with the service provider 18 is authenticated.

When the IP-IP connection is completed, the computer 15 on the receiving side calls the telephone set 12 on the receiving side. In this state, the telephone set 11 and the telephone set 12 can start a call.

It is assumed that, while a call is proceeding, the user of the telephone set 11 performs an on-hook operation (S347, YES). When a call using the Internet 19 is proceeding (S356, YES), the computer 14 on the originating side supplies a request to release the IP-IP connection to the service provider 17 on the originating side (S357). The service provider 17 on the originating side receiving the request to release the IP-IP connection terminates the IP-IP connection (S358) so as to end the call. When a call using the public network 16 is proceeding (S356, NO), the computer 14 on the originating side terminates the connection with the public network 16 (S359) so as to end the call.

The computer 14 on the originating side continues to monitor the transmission rate of conversation data on the Internet 19 to determine whether there is any abnormality in the transmission rate (S348). It is assumed that the transmission rate of conversation data is preset by the user of the system.

For example, when the computer 14 on the originating side has detected an abnormality in the transmission rate during a call (S347, NO) (S348, YES), the telephone set 14 on the originating side transmits a network switch notification to the computer 15 on the receiving side (S351) and supplies a request to release the IP-IP connection to the service provider 17 on the originating side (S352). The service provider 17 on the originating side receiving the request to release the IP-IP connection terminates the IP-IP connection (S353).

After terminating the IP-IP connection, the computer 14 on the originating side dials the computer 15 on the receiving side over the public network 16 (S354) and establishes a connection therewith over the public network 16. Thus, the user of the telephone set 11 can make a telephone call without being aware of the switch from the Internet 19 to the public network 16.

For example, when the computer 15 on the receiving side has detected an abnormality in the transmission rate during a call and the computer 14 has received a network switch notification from the computer 15 (S347, NO) (S348, NO) (S349, YES), the telephone set 14 on the originating side stores information relating to the network switching (S355).

When the user of the telephone set 11 does not perform an on-hook operation during a call (S347, NO), when the computer 14 on the originating side does not detect an abnormality in the transmission rate during the call (S348, NO) and when the network switch notification from the computer 15 is not received during the call (S349, NO), the computer 14 on the originating side maintains the call state (S350).

Figure 32:
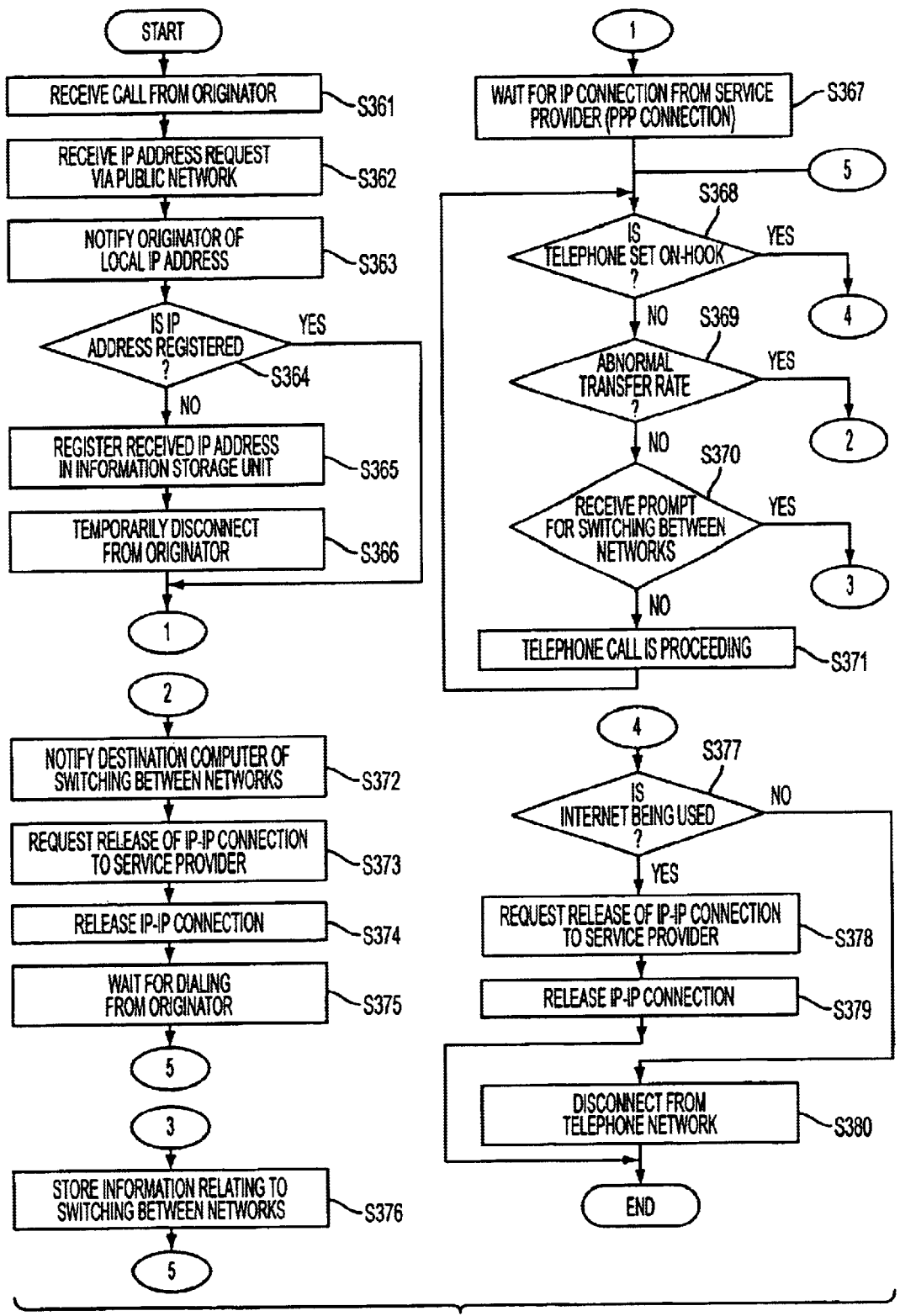
FIG. 32 is a flowchart of a process performed on the receiving side of a dial-up Internet telephone system.

FIG. 32 is a flowchart of a process performed on the receiving side of a dial-up Internet telephone system in which the Internet 19 is accessed by a dial-up connection.

When the computer 15 on the receiving side receives a dialing signal from the telephone set 11 on the originating side (S361), the computer 15 on the receiving side receives an IP address request, a phone number and an IP address from the originating side (S362). The computer 15 on the receiving side receiving the IP address request supplies the received phone number and IP address to the computer 14 on the originating side as a reply (S363).

The computer 15 on the receiving side receiving the phone number and IP address from the originating side searches itself to determine whether the received information is registered in the computer 15 (S364).

When the phone number and the IP address are not registered (S364, NO), the computer 15 on the receiving side registers the phone number and the IP address from the originating side (S365), terminates the connection with the public network 16 connected to the computer 14 on the originating side (S36&), and waits for an IP-IP connection over the Internet 19 with the computer 14 on the originating side (S367). When the recipient phone number is received from the service provider 17 on the originating side, the service provider 18 on the receiving side dials the computer 15 on the receiving side using the received phone number so that the computer 15 on the receiving side calls the telephone set 12 when the connection with the service provider 18 is authenticated. In this state, the telephone set 11 and the telephone set 12 can start a call.

When it is determined in step 364 that the phone number and the IP address from the originating side are registered in the computer 15 (S364, YES), the computer 15 on the receiving side waits for an IP-IP connection over the Internet 19 with the computer 14 on the originating side (S367). When the recipient phone number is received from the service provider 17 on the originating side, the service provider 18 on the receiving side dials the computer 15 on the receiving side using the received phone number so that the computer 15 on the receiving side calls the telephone set 12 when connection with the service provider 18 is authenticated.

When the IP-IP connection is completed, the computer 15 on the receiving side calls the telephone set 12 on the receiving side. In this state, the telephone set 11 and the telephone set 12 can start a call.

It is assumed that, while a call is proceeding, the user of the telephone set 12 performs an on-hook operation (S368, YES).

When a call using the Internet 19 is proceeding (S377, YES), the computer 15 on the receiving side supplies a request to release the IP-IP connection to the service provider 18 on the receiving side (S378). The service provider 18 on the receiving side receiving the request to release the IP-IP connection terminates the IP-IP connection (S379) so as to end the call. When a call using the public network 16 is proceeding (S377, NO), the computer 15 on the receiving side terminates the connection with the public network 16 (S380) so as to end the call.

The computer 15 on the receiving side continues to monitor the transmission rate of conversation data on the Internet 19 to determine whether there is any abnormality in the transmission rate (S369). It is assumed that the transmission rate of conversation data is preset by the user of the system.

For example, when the computer 15 on the receiving side has detected an abnormality in the transmission rate during a call (S368, NO) (S369, YES), the telephone set 12 on the receiving side transmits a network switch notification to the computer 14 on the originating side (S372) and supplies a request to release the IP-IP connection to the service provider 18 on the receiving side (S373). The service provider 18 on the receiving side receiving the request to release the IP-IP connection terminates the IP-IP connection (S374).

After the IP-IP connection is terminated, the computer 15 on the receiving side waits for a dialing signal from the computer 14 on the originating side (S375), and when the dialing signal arrives from the computer 14 on the originating side, it establishes a connection therewith over the public network 16. Thus, the user of the telephone set 12 can receive a telephone call without being aware of the switch from the Internet 19 to the public network 16.

For example, when the computer 14 on the originating side detects an abnormality in the transmission rate during a call, and when the computer 15 receives a network switch notification from the computer 14 (S368, NO) (S369, NO) (S370, YES), the telephone set 15 on the receiving side stores information relating to the network switching (S376).

When the user of the telephone set 12 does not perform an on-hook operation during a call (S368, NO), when the computer 15 on the receiving side does not detect an abnormality in the transmission rate during the call (S369, NO) and when the network switch notification from the computer 14 is not received during the call (S370, NO), the computer 15 on the receiving side maintains the call state (S371).

Figure 33:
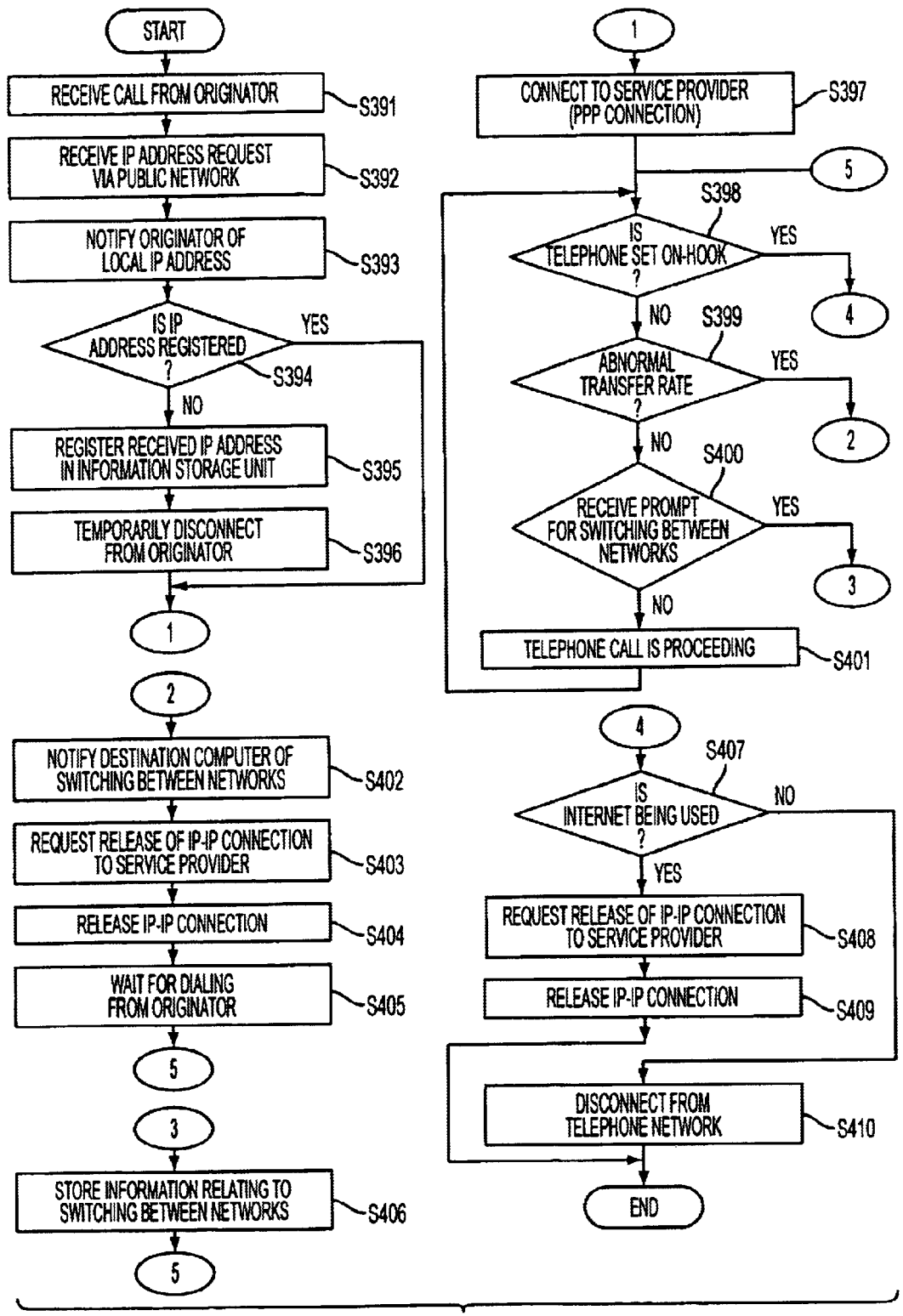
FIG. 33 is a flowchart of another process performed on the originating side of a dial-up Internet telephone system.

FIG. 33 is a flowchart of a process performed on the receiving side of a dial-up Internet telephone system in which the Internet 19 is accessed by a dial-up connection, showing a process different from the process of FIG. 32.

When the computer 15 on the receiving side receives a dialing signal from the telephone set 11 on the originating side (S391), the computer 15 on the receiving side receives an IP address request, and a phone number and an IP address from the originating side (S392). The computer 15 on the receiving side receiving the IP address request supplies a phone number and an IP address on the receiving side to the computer 14 on the originating side as a reply (S393).

The computer 15 on the receiving side receiving the phone number and the IP address from the originating side searches itself to determine whether the received information is registered in the computer 15 (S394).

When the phone number and the IP address are not registered (S394, NO), the computer 15 on the receiving side registers the phone number and the IP address from the originating side (S395), and terminates the connection with the public network 16 connected to the computer 14 on the originating side (S396). The computer 15 on the receiving side dials the service provider 18 on the receiving side (S397) so that the service provider 18 on the receiving side compares the information previously received from the service provider 17 on the originating side and the information from the computer 15 on the receiving side. When the connection with the service provider 18 is authenticated, the computer 15 on the receiving side calls the telephone set 12.

When it is determined in step 364 that a phone number and an IP address from the originating side are registered in the computer 15 (S394, YES), the computer 15 on the receiving side dials the service provider 18 on the receiving side (S397) so that the service provider 18 on the receiving side compares the information previously received from the service provider 17 on the originating side and the information from the computer 15 on the receiving side. When the connection with the service provider 18 is authenticated, the computer 15 on the receiving side calls the telephone set 12.

When the IP-IP connection is completed, the computer 15 on the receiving side calls the telephone set 12 on the receiving side. In this state, the telephone set 11 and the telephone set 12 can start a call.

It is assumed that the user of the telephone set 12 performs an on-hook operation while a call is proceeding (S398, YES). When a call using the Internet 19 is proceeding (S407, YES), the computer 15 on the receiving side supplies a request to release the IP-IP connection to the service provider 18 on the receiving side (S408). The service provider 18 on the receiving side receiving the request to release the IP-IP connection terminates the IP-IP connection (S409) so as to end the call. When a call using the public network 16 is proceeding (S407, NO), the computer 15 on the receiving side terminates the connection over the public network 16 (S410) so as to end the call.

The computer 15 on the receiving side continues to monitor the transmission rate of conversation data on the Internet 19 to determine whether there is any abnormality in the transmission rate (S399). It is assumed that the transmission rate of conversation data is preset by the user of a system.

For example, when the computer 15 on the receiving side has detected an abnormality in the transmission rate during a call (S398, NO) (S399, YES), the telephone set 15 on the receiving side transmits a network switch notification to the computer 14 on the originating side (S402) and supplies a request to release the IP-IP connection to the service provider 18 on the receiving side (S403). The service provider 18 on the receiving side receiving the request to release the IP-IP connection terminates the IP-IP connection (S404).

After terminating the IP-IP connection, and the computer 15 on the receiving side waits for a dialing signal from the computer 14 on the originating side (S405), and when the dialing signal arrives from the computer 14 on the originating side, it establishes a connection over the public network 16. Thus, the user of the telephone set 12 can receive a telephone call without being aware of the switch from the Internet 19 to the public network 16.

For example, when the computer 14 on the originating side detects an abnormality in the transmission rate during a call, and when the computer 15 receives a network switch notification from the computer 14 (S398, NO) (S399, NO) (S400, YES), the telephone set 15 on the receiving side stores information relating to the network switching (S406).

When the user of the telephone set 12 does not perform an on-hook operation during a call (S398, NO), when the computer 15 on the receiving side does not detect an abnormality in the transmission rate during the call (S399, NO) and when the network switch notification from the computer 14 is not received during the call (S400, NO), the computer 15 on the receiving side maintains the call state (S401).

Figure 34:
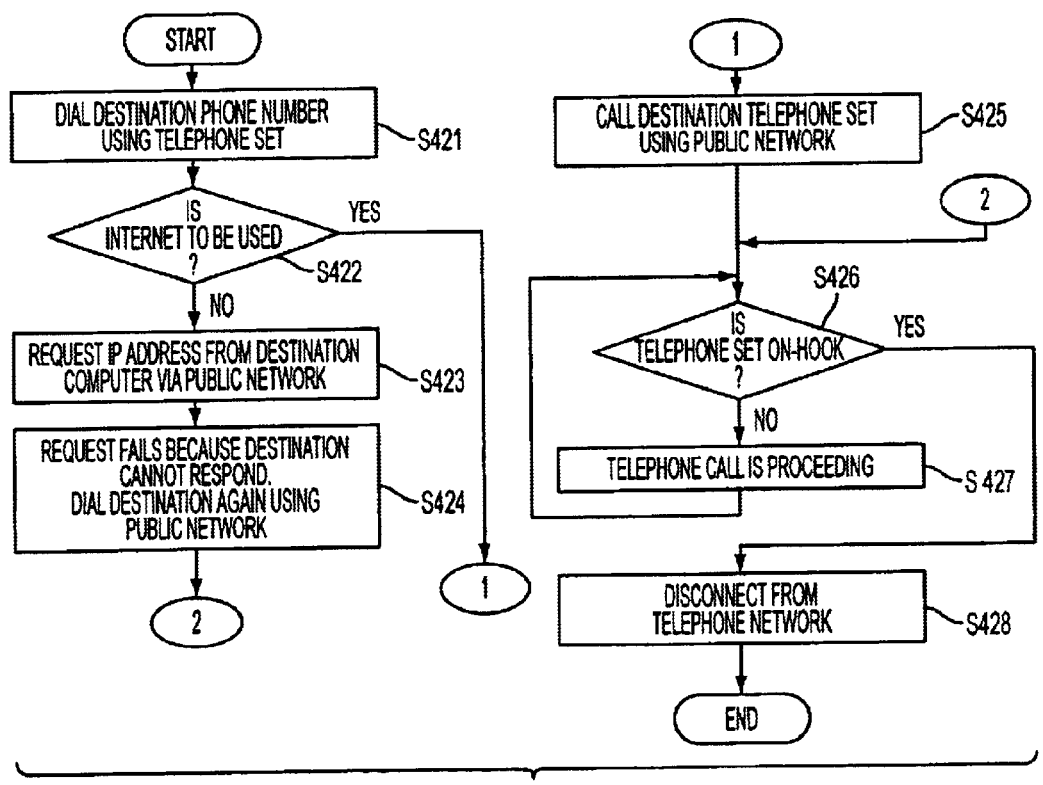
FIG. 34 is a flowchart of a process performed on the originating side of a dial-up Internet telephone system when communication proceeds between the dial-up Internet telephone system and an existing telephone set.

FIG. 34 is a flowchart of a process performed between a dial-up type Internet telephone system in which the Internet 19 is accessed by a dialup connection, and the existing telephone set to which a computer is not connected.

When the telephone set 11 on the originating side dials a phone number of the telephone set 13 on the receiving side (S421), the computer 14 on the originating side examines itself to determine whether information indicating that the Internet is to be used is registered in the computer 14 and whether a call destination phone number and an IP address are registered in the computer 14 (S422).

When the destination phone number is not registered, or when the destination phone number is registered and, at the same time, the information indicating that the Internet is to be used is provided in correspondence to the registered phone number, the computer 14 on the originating side dials the previously received recipient phone number so as to request an IP address from the telephone set 13 on the receiving side over the public network 16 (S423). Simultaneously, the computer 14 supplies a phone number and an IP address from the originating side. Because the telephone set 13 on the receiving side cannot recognize the IP address request which it receives, it rejects the request by, for example, not returning a response. In this case, the computer 14 on the originating side recognizes that the telephone set 13 is an ordinary telephone set not connected to a computer, and performs a dialing operation over the public network 16 for a second time (S424).

When the destination phone number is registered and the information indicating that the Internet is not to be used is provided in correspondence to the registered phone number, the computer 14 on the originating side recognizes that the telephone set 13 on the receiving side is an ordinary telephone set to which a computer is not connected, and performs a dialing operation over the public network 16 (S425).

In this state, the telephone set 11 and telephone set 13 can start an ordinary telephone call over the public network 16 (S426, NO) (S427). When the user of the telephone set 11 on the originating side or the user of the telephone set 13 on the receiving side performs an on-hook operation during a call (S426, YES), the connection over the public network 16 is terminated (S428).

According to the Internet telephone system of the present invention, a telephone set on the originating side can make a telephone call to a recipient telephone set, by an operation similar to the ordinary operation for using a telephone set. Information of the telephone set need not be registered in a computer on the network managing the system.

According to the Internet telephone system of the present invention, long-distance calls can be made at a relatively low cost because the user uses the Internet as a communication network.

According to the Internet telephone system of this invention, the telephone operation performed by the user is similar to the operation performed when the user uses the public network. Therefore, the user need not be aware of different communication networks in use.

Figure 1:
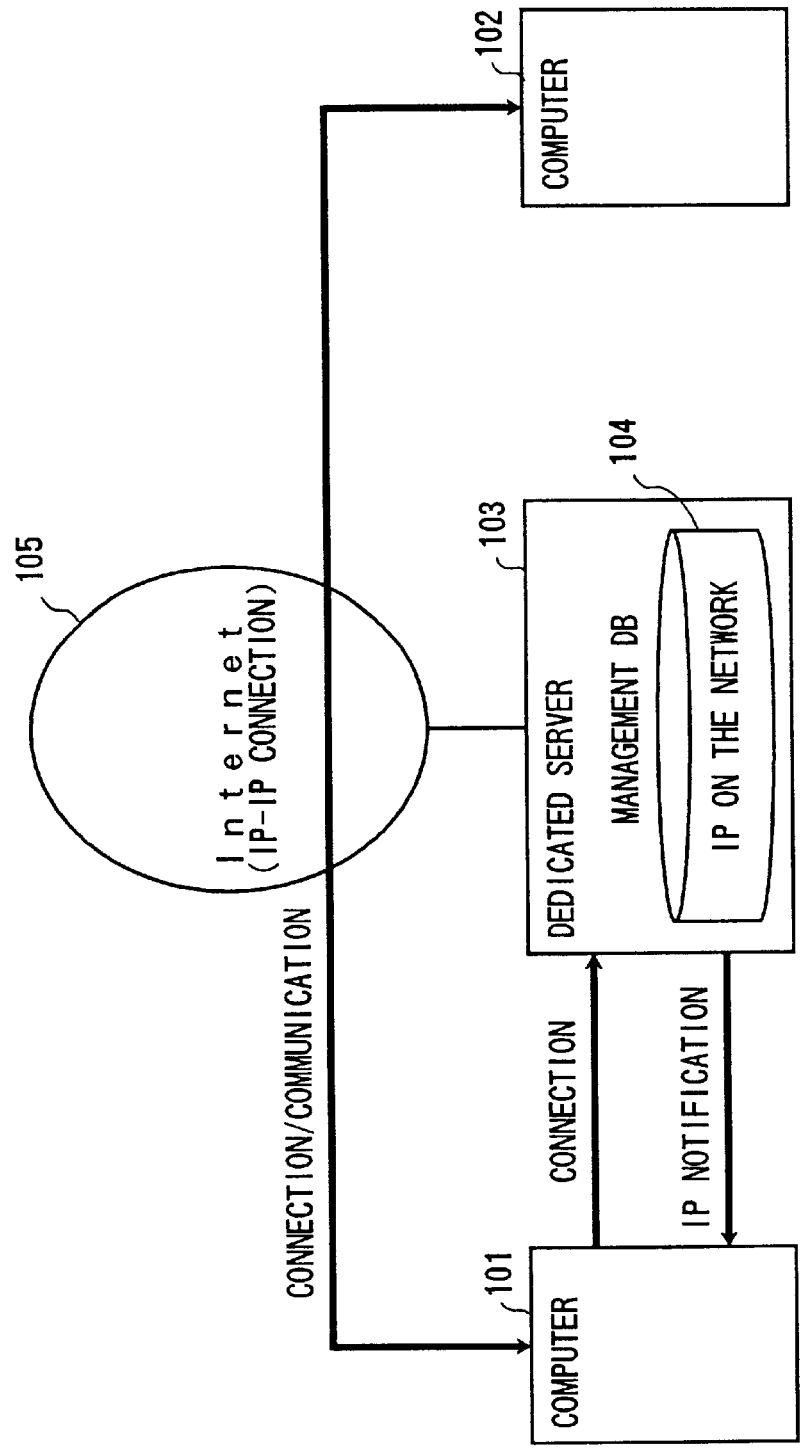
FIG. 1 shows an Internet telephone system according to the related art.
Figure 2:
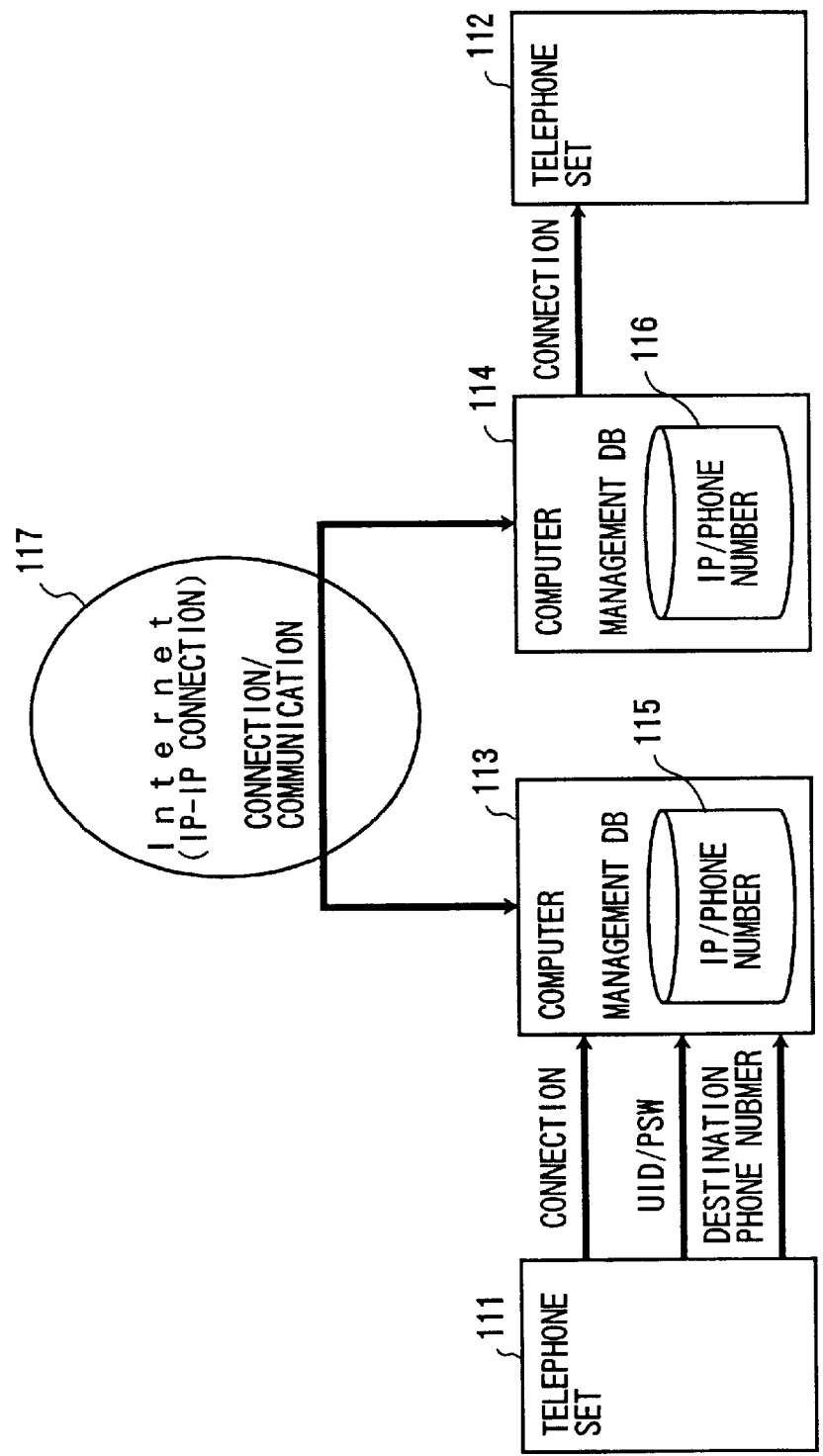
FIG. 2 shows another Internet telephone system according to the related art.
Figure 3:
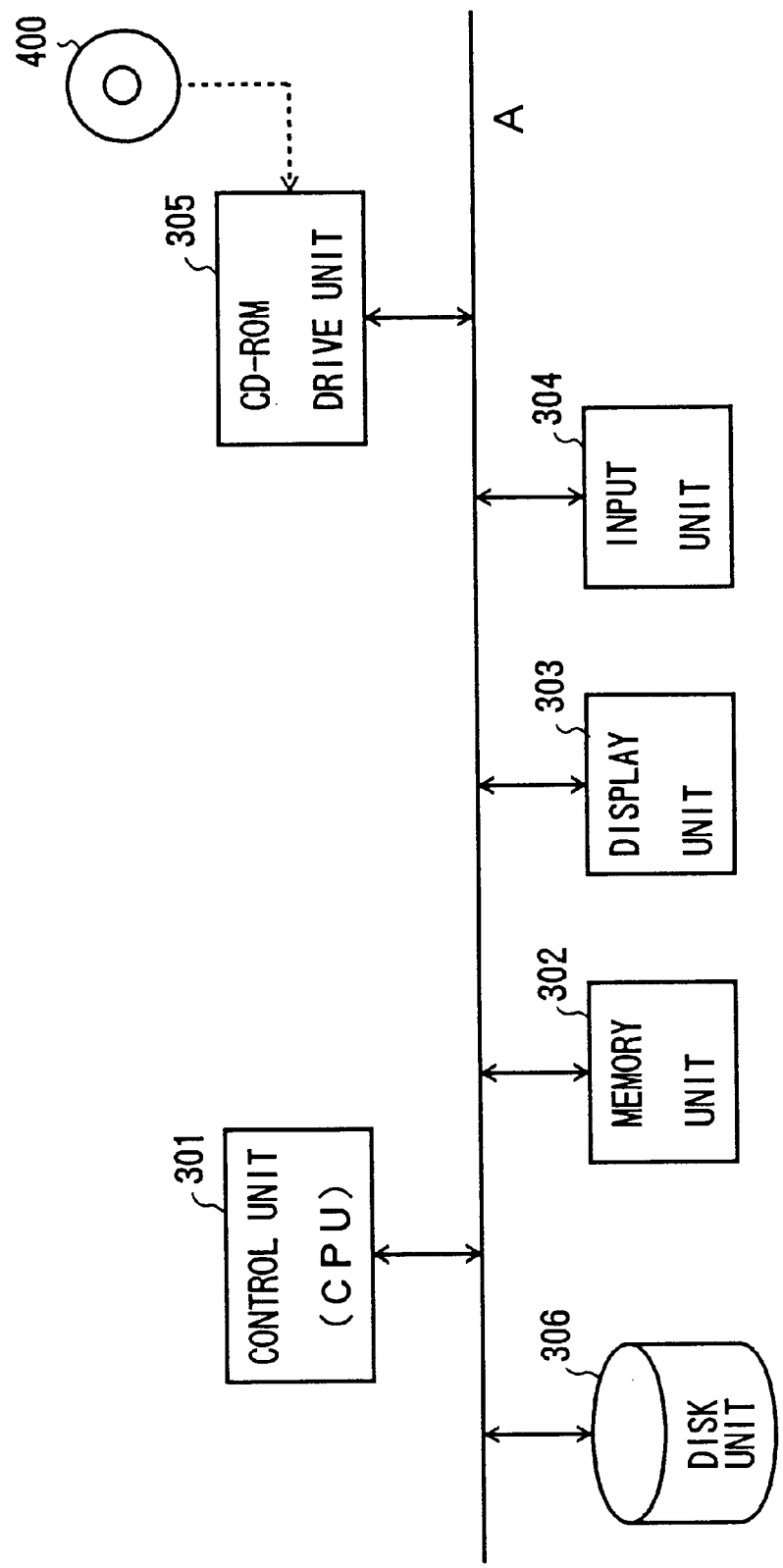
FIG. 3 shows a construction of a communication device according to the present invention.

FIG. 3 shows a construction of a computer which implements the communication device of the Internet telephone system according to the invention.

Referring to FIG. 3, the computer comprises a control unit 301 which includes a CPU, a memory unit 302, a display unit 303, an input unit 304, a CD-ROM drive unit 305 and a disk unit 306. These units are connected to each other via a system bus A. The control unit 301 executes a program which stores processes of the Internet telephone system.

The memory unit 302 includes a memory such as a RAM or a ROM, and stores the program to be executed by the control unit 301 and the data obtained in the process of execution.

The display unit 303 is implemented by a CRT or an LCD (liquid crystal display panel) to display various information.

The input unit 304 is implemented by a keyboard, a mouse or the like.

A program for executing the process of the Internet telephone system is stored in a CD-ROM 400.

A program is installed in the disk unit 306 from the CD-ROM 400 set in the CD-ROM drive unit 305. The program is read out from the disk unit 306 when the computer is started and is stored in the memory unit 302. In this state, the control unit 301 (CPU) executes the process of the Internet telephone system, according to the program stored memory unit 302.

The CD-ROM 400 contains the program for the process of the Internet telephone system concerned, but the storage medium for storing the program need not be limited to a CD-ROM. Depending on the specification of a computer constituting the system, other types of recording medium such as a magnetic disk like a floppy disk, a MO disk, or a magnetic tape may also be used.

According to the Internet telephone system of the present invention, an originating user can make a telephone call to a recipient user, by an operation similar to the operation for using an ordinary telephone set. Information of the originating user need not be registered in a computer on the network managing the system.

In further accordance with the Internet telephone system of the present invention, long-distance calls can be made at a relatively low cost because the user uses the Internet as a communication network.

In further accordance with the Internet telephone system of this invention, the telephone operation performed by the user is similar to the operation performed when the user uses the public network. Therefore, the user need not be aware of different communication networks in use.

The present invention is not limited to the above-described embodiments, and variations and modifications may be made without departing from the scope of the present invention.

What is claimed is:

1. An Internet telephone system for implementing audio communication over the Internet between telephone sets using communication devices locally connected to the respective telephone sets and connecting with a Public Switched Telephone Network (PSTN), wherein each of the communication devices comprises:

a connection unit separate from the PSTN, to form a PSTN connection by dialing a remote telephone set and a remote repeater device via the PSTN when a call is originated from the local telephone set of the communication device by a caller dialing a basic call to the remote telephone set; and a communication unit separate from the PSTN, which obtains, via the PSTN connection from a communication device of the remote telephone set, information necessary for establishing an Internet connection with the communication device of the remote telephone set, and controls the repeater device according to the obtained information to establish the Internet connection with the communication device of the remote telephone set.

2. The Internet telephone system as claimed in claim 1, wherein each of the communication devices further comprises:

a registering unit registering predetermined control information transmitted to and received from a remote communication device connected to the remote telephone set; and an information storage unit storing the control information registered by the registering unit, wherein a user registers the control information and the connection unit and the communication unit control the repeater device in accordance with the registered control information.

3. The Internet telephone system as claimed in claim 1, wherein each of the communication devices further comprises:

a monitoring unit separate from the PSTN, monitoring communication data on the Internet while an Internet call using the Internet is proceeding; and a switching unit separate from the PSTN, switching the Internet call using the Internet to a telephone call using the PSTN, when it is determined that a predetermined transfer rate for the communication data fails to be guaranteed.

4. The Internet telephone system as claimed in claim 1, wherein each of the communication devices comprises an activating unit automatically activating hardware and software necessary for a call, when it is determined upon origination of a call by an originating telephone set that a main power supply of the communication device is on but the necessary hardware and the software are not activated.

5. The Internet telephone system as claimed in claim 1, wherein each of the communication devices comprises a converting unit converting analog data output from an originating telephone set into digital data, and converting digital data into analog data to be supplied to a destination telephone set.

6. The Internet telephone system as claimed in claim 1, wherein the repeater device comprises a conversation data buffer unit buffering received in-transit real-time bilateral conversation data and transmitting the buffered in-transit real-time bilateral data to a second communication device when the received conversation data cannot be transmitted to a first communication device.

7. A communication device for an Internet telephone system for implementing audio communication over the Internet, locally connecting to a telephone set and connecting with a PSTN, the communication device comprising:

a connection unit to form a PSTN connection by dialing a remote telephone set and a remote repeater device via the PSTN when a call is originated by a local telephone set of the communication device by a caller dialing a basic call to the remote telephone set; and a communication unit which obtains, via the PSTN connection from a communication device of the remote telephone set, information necessary for establishing an Internet connection with the communication device of the remote telephone set, and controls the repeater device according to the obtained information to establish the Internet connection with the communication device of the remote telephone set.

8. The communication device as claimed in claim 7, further comprising:

a registering unit registering predetermined control information transmitted to and received from a remote communication device connected to the remote telephone set; and an information storage unit storing the control information registered by the registering unit, wherein the connection unit and the communication unit control the repeater device in accordance with the control information.

9. The communication device as claimed in claim 7, further comprising:

a monitoring unit monitoring communication data on the Internet while an Internet call using the Internet is proceeding; and a switching unit switching the Internet call using the Internet to a telephone call using the PSTN, when it is determined that a predetermined transfer rate for the communication data fails to be guaranteed.

10. The communication device as claimed in claim 7, further comprising:

an activating unit automatically activating hardware and software necessary for a call, when it is determined upon origination of a call by an originating telephone set that a main power supply of the communication device is on but the necessary hardware and the software are not activated.

11. The communication device as claimed in claim 7, further comprising a converting unit converting analog data output from an originating telephone set into digital data, and converting digital data into analog data to be supplied to a destination telephone set.

12. A machine-readable recording medium storing a program for implementing audio communication over the Internet between telephone sets using communication devices locally connected to the respective telephone sets and connecting with a PSTN, the program performing a process comprising:

forming a PSTN connection by causing a communication device to dial a remote telephone set and a remote repeater device via the PSTN when a call is originated from a local telephone set of the communication device by a caller dialing a basic call to the remote telephone set; and causing the communication device to obtain, via the PSTN connection from a communication device of the remote telephone set, information necessary for establishing an Internet connection with the communication device of the remote telephone set, and controls the repeater device according to the obtained information to establish the Internet connection with the communication device of the remote telephone set.

13. The machine-readable recording medium as claimed in claim 12, wherein the program further comprises: causing the communication device to register predetermined control information transmitted to and received from a remote communication device connected to the remote telephone set; and storing the control information registered.

14. The machine-readable recording medium as claimed in claim 12, wherein the program further comprises:

monitoring communication data on the Internet while an Internet call using the Internet is proceeding; and switching the Internet call using the Internet to a telephone call using the PS,TN, when it is determined that a predetermined transfer rate for the communication data fails to be guaranteed.

15. The machine-readable recording medium as claimed in claim 12, wherein the program further comprises automatically activating hardware and software necessary for a call, when it is determined upon origination of a call by an originating telephone set that a main power supply of the communication device is on but the necessary hardware and the software are not activated.

16. The machine-readable recording medium as claimed in claim 12, wherein the program further comprises converting analog data output from an originating telephone set into digital data, and converting digital data into analog data to be supplied to a destination telephone set.

17. An apparatus coupled to a packet switched network and a PSTN, comprising:
- a first connection and routing unit, separate from and connected to the PSTN and the packet switched network, processing a telephone call originated by a local telephone set of the first connection and routing unit by establishing a voice data telephone connection through the PSTN for a destination, and by establishing voice data communication through the packet switched network with the destination, where the data communication is established by the routing unit obtaining an Internet address via the PSTN from the destination; and
- a second connection and routing unit, at the destination, associated with the Internet address, connected to and separate from the PSTN and the packet switched network, receiving and outputting the voice data received from the first connection and routing unit via the voice data communication and the voice data connection, and providing the Internet address via the PSTN to the first connection and routing unit.

18. A method for initiating an Internet connection to be used for an Internet phone call, the method comprising:
- receiving a telephone number from a local telephone set dialing a remote telephone number, the receiving being done by an apparatus separate from the PSTN and locally connected to the telephone;
- responsive to the receiving, automatically dialing and establishing a PSTN phone connection in accordance with the remote phone number, the dialing being done by the apparatus;
- receiving, with the apparatus, over the PSTN phone connection, internet connection information corresponding to the remote phone number; and
- using, with the apparatus, the received internet connection information to initiate and establish an internet connection with a remote apparatus corresponding to the phone number, and carrying voice data of the local telephone set over the internet connection.

\* \* \* \* \*

UNITED STATES PATENT AND TRADEMARK OFFICE
CERTIFICATE OF CORRECTION

PATENT NO. : 6,819,663 B2
DATED : November 16, 2004
INVENTOR(S) : Toshinao Komuro It is certified that error appears in the above-identified patent and that said Letters Patent is hereby corrected as shown below:

<u>Column 32,</u>
Line 55, change "PS, TN" to -- PSTN --

Signed and Sealed this

Twenty-eighth Day of June, 2005

JON W. DUDAS
*Director of the United States Patent and Trademark Office*